United States Patent
Mogi et al.

(10) Patent No.: US 7,865,772 B2
(45) Date of Patent: Jan. 4, 2011

(54) MANAGEMENT DEVICE AND MANAGEMENT METHOD

(75) Inventors: Kazuhiko Mogi, Sagamihara (JP); Norifumi Nishikawa, Machida (JP); Takashi Oeda, Sagamihara (JP); Nobuo Kawamura, Atsugi (JP)

(73) Assignee: Hitachi, Ltd., Tokyo (JP)

( * ) Notice: Subject to any disclaimer, the term of this patent is extended or adjusted under 35 U.S.C. 154(b) by 335 days.

(21) Appl. No.: 11/968,209

(22) Filed: Jan. 2, 2008

(65) Prior Publication Data
US 2008/0184068 A1 Jul. 31, 2008

(30) Foreign Application Priority Data
Jan. 24, 2007 (JP) .............................. 2007-013393

(51) Int. Cl.
G06F 11/00 (2006.01)
(52) U.S. Cl. ............................. 714/20; 714/15; 709/223
(58) Field of Classification Search .................. 714/15, 714/20; 709/223
See application file for complete search history.

(56) References Cited

U.S. PATENT DOCUMENTS

| | | | |
|---|---|---|---|
| 7,552,238 B2* | 6/2009 | Gulland | 709/248 |
| 7,606,889 B1* | 10/2009 | Kundala et al. | 709/223 |
| 7,627,745 B2* | 12/2009 | Martinez et al. | 713/2 |
| 2003/0149756 A1* | 8/2003 | Grieve et al. | 709/223 |
| 2004/0054648 A1 | 3/2004 | Mogi et al. | |
| 2006/0150001 A1 | 7/2006 | Eguchi et al. | |

FOREIGN PATENT DOCUMENTS

| | | |
|---|---|---|
| JP | 2004-110218 | 4/2004 |
| JP | 2004-252686 | 9/2004 |
| JP | 2005-182588 | 7/2005 |

* cited by examiner

*Primary Examiner*—Robert Beausoliel
*Assistant Examiner*—Charles Ehne
(74) *Attorney, Agent, or Firm*—Brundidge & Stanger, P.C.

(57) ABSTRACT

A management device stores configuration history information indicating a history of system configuration changes, from this information, specifies a system configuration of a recovery time, which is a certain point in time in the past, specifies a system configuration of the current time, and compares the system configuration of the recovery time with the system configuration of the current time, and based on the results of this comparison, specifies whether or not there is a system configuration part in the system configuration of the current time for which, if data of the recovery time is recovered, a setting change is required in order to access this recovered data. When this system configuration part is specified, the management device constructs a system configuration for enabling a data utilization unit to access the recovered data by issuing an indication related to a required setting change to an element capable of carrying out the setting change for this system configuration part.

7 Claims, 19 Drawing Sheets

FIG. 5

| LOGICAL VOLUME ID 452 | PARTITION ID 454 | BLOCK NUMBER 456 | MOUNT POINT 458 | RAW DEVICE PATHNAME 460 |
|---|---|---|---|---|
| Lvol 1-1 | 0 | 512-1023999 | /DB1 | — |
| Lvol 1-1 | 1 | 1024000-2047999 | — | — |
| Lvol 1-2 | 0 | 512-3839999 | — | /dev/raw/raw1 |
| ⋮ | ⋮ | ⋮ | ⋮ | ⋮ |

| LOGICAL VOLUME ID 452 | HIGHER-LEVEL BLOCK NUMBER 462 | SWITCH ID 464 | LOWER-LEVEL VOLUME ID 466 | LOWER-LEVEL BLOCK NUMBER 468 |
|---|---|---|---|---|
| Lvol 1-1 | 0-1280000 | VSW1 | Vvol 1-1 | 0-1279999 |
| Lvol 1-1 | 1280000-2559999 | VSW2 | Vvol 2-1 | 0-1279999 |
| Lvol 1-2 | 0-6399999 | VSW1 | Vvol 1-1 | 1280000-7679999 |
| ⋮ | ⋮ | ⋮ | ⋮ | ⋮ |

| RECEIVING PORT ID 472 | SWITCH ID 464 | LOWER-LEVEL VOLUME ID 466 |
|---|---|---|
| Port A | VSW1 | Vvol 1-1, ... |
| Port B | VSW2 | Vvol 2-1, ... |
| Port C | VSW1 | — |
| ⋮ | ⋮ | ⋮ |

OS SETTING INFORMATION 440

FIG. 8

BACKUP DATA INFORMATION

| STORAGE DEVICE ID (612) | BASE LU ID (614) | SNAPSHOT LU ID (616) | ACQUISITION TIME (618) |
|---|---|---|---|
| Str1 | LU 1-1 | LU 1-11 | 2005/12/01 00:00:00 |
| Str1 | LU 1-1 | LU 1-12 | 2005/12/01 12:00:00 |
| Str2 | LU 1-3 | LU 1-31 | 2005/12/01 00:00:00 |
| ⋮ | ⋮ | ⋮ | ⋮ |

| STORAGE DEVICE ID (622) | JOURNAL ACQUISITION TARGET LU ID (624) | JOURNAL LU ID (626) | JOURNAL ACQUISITION PERIOD (628) | |
|---|---|---|---|---|
| | | | START TIME | END TIME |
| Str1 | LU 1-101, LU 1-102 | LU 1-1 | 2005/12/01 00:00:00 | 2005/12/01 12:00:00 |
| Str1 | LU 1-103, LU 1-104 | LU 1-1 | 2005/12/01 12:00:00 | — |
| Str2 | LU 1-111, LU 1-112, ... | LU 1-3, ... | 2005/12/01 00:00:00 | — |
| ⋮ | ⋮ | ⋮ | ⋮ | ⋮ |

| DBMS ID (642) | LOG PERIOD (644) | ARCHIVE DESTINATION INFORMATION (646) | | |
|---|---|---|---|---|
| | | STORAGE DEVICE ID | LU ID | STORAGE DESTINATION |
| DBMS1 | 2005/12/01 00:00:00 ~ 2005/12/01 12:00:00 | Str1 | LU 1-201 | Raw, 1000 - 20000 |
| DBMS2 | 2005/12/01 06:00:00 ~ 2005/12/01 18:00:00 | Str2 | LU 2-103 | File: partithion:2, path: /Arch/20051201_1 |
| ⋮ | ⋮ | ⋮ | ⋮ | ⋮ |

144

MANAGEMENT DEVICE AND MANAGEMENT METHOD

CROSS-REFERENCE TO PRIOR APPLICATION

This application related to and claims the benefit of priority from Japanese Patent Application number 2007-13393, filed on Jan. 24, 2007, the entire disclosure of which is incorporated herein by reference.

BACKGROUND

The present invention relates to technology for recovering data at a certain point in time in the past in a computer system.

Data in a database (hereinafter, DB) utilized by a corporate computer system is generally stored in a storage device, and is managed by software called a database management system (hereinafter, DBMS). DB data (at least one piece of data of a plurality of data constituting a DB) is regularly backed up (in other words, a backup is implemented), and when a system failure occurs, the status at a desired point in time is recovered using backup data (DB data that has been backed up), and a log, which is a DB data update history.

A DB recovery process (a process for recovering DB data) that uses a log is nothing more than re-executing a data update as per an update history recorded in the log. For this reason, when the backup frequency is low, it is highly likely that recovery will have to be carried out from old DB data using a large quantity of logs, meaning that the time required for the DB recovery process will probably become quite long. Further, when the data integrity of the DB data (backup data and so forth), which forms the basis for a DB recovery process, has not been ensured, a DB recovery process must be carried out using even older logs in order to restore data integrity.

Technology aimed at shortening the time required for a DB recovery process, for example, is disclosed in literature 1 (Japanese Patent Laid-open No. 2004-252686). In literature 1, a storage device also acquires a data update history (hereinafter, storage journal). Consequently, data inside the storage device is returned to a state of an arbitrary point in time, thereby achieving an effect equivalent to frequently carrying out a backup. Further, information of a point in time when the integrity of the DB data inside the storage device is acquired from the DBMS, is simultaneously stored with this information inside the storage journal. This information is used to return the data inside the storage device to a point in time at which the DB recovery process will not take a lot of time.

Further, for reasons of enhancing computer system throughput, the configuration related to a computer system (hereinafter abbreviated as "system configuration") is likely to change. Thus, there is the possibility that data backed up in the past will not be able to be used in the current system configuration. In Literature 2 (Japanese Patent Laid-open No. 2005-182588), there is disclosed technology, which holds configuration information from a computer at data backup time in a storage device, and ascertains if the backed up data is usable in the current system configuration.

For example, in the technology disclosed in literature 1, the system configuration is not taken into account. Thus, even if a storage journal is used to return to the state of the data inside the storage device at a certain point in time, there are instances when the computer cannot utilize this data due to the system configuration.

In the technology disclosed in literature 2, a determination is made as to whether or not backup data (data that has been backed up) is usable in the current system configuration. However, when it is determined that the backup data is not usable in the current system configuration, no support is given to change the system configuration. If backup data is not capable of being used in the current system configuration, construction (for example, restoration or new construction) of a system configuration that accords with the backup data will enable the backup data to be used. At present, the construction of this system configuration must be carried out manually by an administrator.

SUMMARY

Therefore, an object of the present invention is to make it possible to easily carry out a DB recovery process, which recovers DB data from a certain point in time in the past, and constructs a system configuration capable of accessing this DB data.

In a computer system in which a host computer accesses a storage device, a management device, which is connected to this host computer and this storage device, comprises a configuration history storage unit, a setting change required/not required specification unit, a data recovery unit, and a system configuration construction unit. The configuration history storage unit stores configuration history information indicating a history of changes to a system configuration, which is a configuration related to an access environment until a data utilization unit which utilizes data, in the above-mentioned host computer, accesses data inside the above-mentioned storage device. The setting change required/not required specification unit specifies the system configuration of a recovery time, which is a certain point in time in the past, by referencing the above-mentioned configuration history information, specifies the system configuration of the current time, compares the above-mentioned system configuration of the recovery time with the above-mentioned system configuration of the current time, and based on the results of this comparison, specifies whether or not there is a system configuration part in the system configuration of the current time that requires a setting change in order to access recovered data when data of the recovery time is recovered. The data recovery unit restores data of the above-mentioned recovery time in the above-mentioned storage device. The system configuration construction unit, upon the above-mentioned system configuration part being specified, constructs a system configuration, which enables the above-mentioned data utilization unit to access the above-mentioned recovered data, by issuing an indication regarding the necessary setting change to an element capable of changing the setting of this system configuration part (for example, at least one of a file system, a volume manager, a control program inside a virtualization switch, and a control program inside a storage device, which will be explained hereinbelow). Furthermore, a system configuration, for example, can be exemplified by which computer program, in which host computer of one or more host computers, accesses data stored in what part of a storage device, and how the access path from this computer program to this data is configured.

The respective units described hereinabove may also be called means. The respective units can also be realized by hardware (for example, circuitry), a computer program, or a combination thereof (for example, either one or a plurality of CPUs, which read and execute a computer program). The computer programs can be read in from a storage resource (for example, a memory) provided in a computer machine. The computer programs can be installed in this storage resource via a storage medium, such as a CD-ROM or a DVD (Digital Versatile Disk), and they can also be downloaded to this storage resource via a communications network, such as the Internet or a LAN.

BRIEF DESCRIPTION OF THE DRAWINGS

FIG. 5 is a schematic view showing an example of a data structure of OS setting information 440;

FIG. 8 is a schematic view showing an example of a data structure of backup data information 144;

DESCRIPTION OF THE PREFERRED EMBODIMENTS

Figure 1:
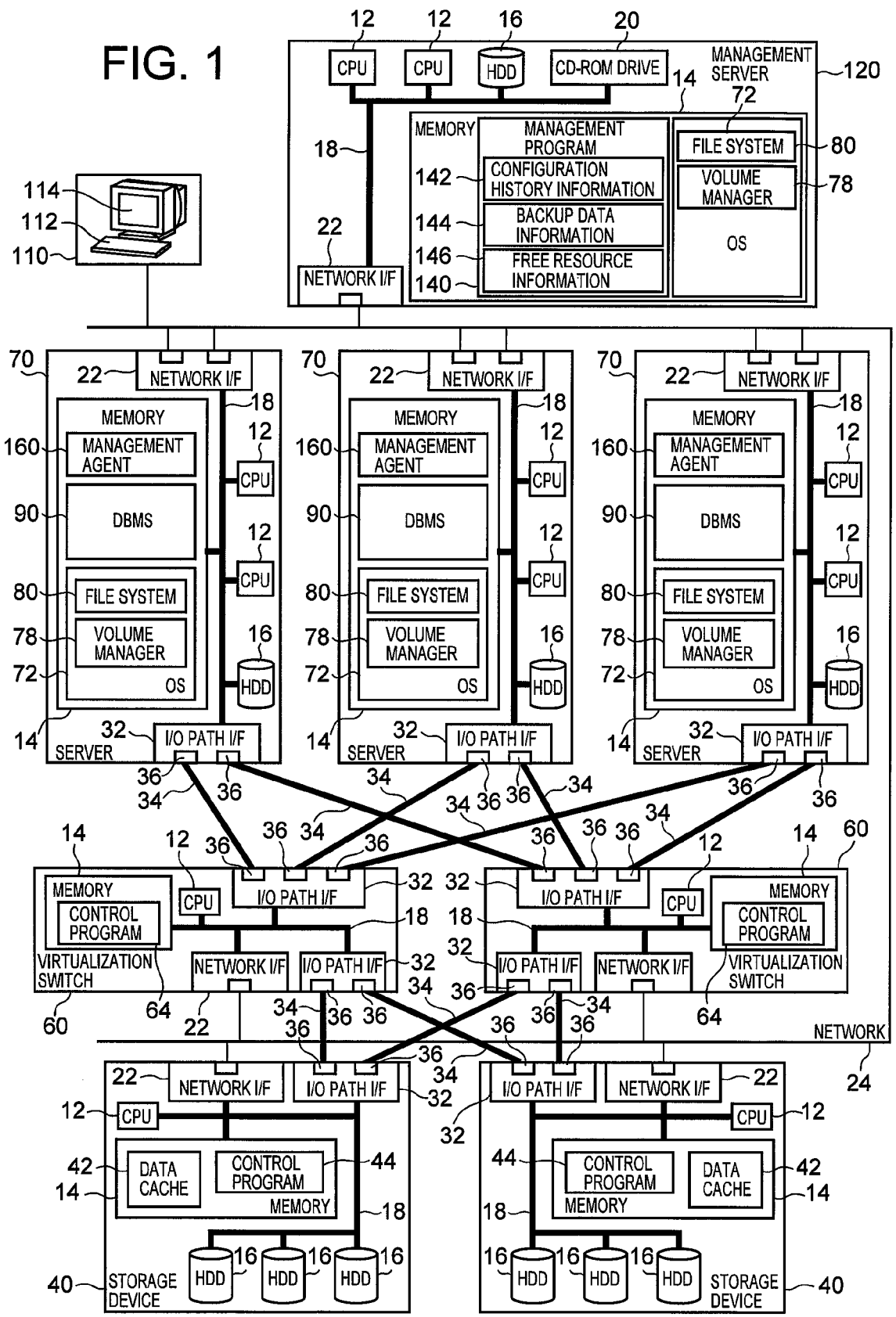
FIG. 1 is a diagram showing an example of a constitution of a computer system of one embodiment of the present invention.

An embodiment of the present invention will be explained hereinbelow. In the following explanation, when describing the recovery of data at a certain point in time in the past, this point in time may be called the "recovery time" and the target of a recovery may be called the "recovery target". If the recovery target is data, it may be called "recovery-targeted data" and if the recovery target is a DBMS, it may be called "recovery-targeted DBMS". The content of a recovery target may differ at the recovery time and at the current time (for example, if the recovery target is data, the content thereof may change due to data updating carried out between the recovery time and the current time), and when differentiating and explaining a recovery target at the respective points in time, for example, recovery target at the recovery time, and recovery target at the current time may be used.

Further, in this embodiment, "system configuration" refers to a configuration related to a computer system, and more particularly, to a configuration related to an access environment. As used here, for example, "access environment" refers to a data path, which a program that uses data (for example, a DBMS) follows until it accesses this data, and more specifically, for example, if described from the higher level (access source side) to the lower level (access destination side), constitutes a hierarchy, such as object, file, logical volume, virtual volume, LU and HDD.

Further, in this embodiment, a "storage configuration" is a configuration related to storage. As used here, for example, "storage" refers specifically to a file system and volume manager comprising an OS operated by a computer, a virtualization switch and a storage device. The scope of the meaning of "storage configuration" is included in the scope of the meaning of "system configuration" described above.

First an overview of this embodiment will be explained. In this embodiment, there is constructed a computer system comprising a host computer (for example, a server, which will be explained below) that runs a DBMS; a storage device for storing DB data (for example, a large-scale RAID (Redundant Array of Independent (or Inexpensive) Disks), which comprises a large number of storage media); and a management device (for example, a management server, which will be explained hereinbelow), which manages a virtualization switch for controlling data transmission between the computer and the storage device, and the storage configuration. The management device holds the change history of the configuration of the storage. Here, storage configuration, for example, is information showing the corresponding relationship between a file system, volume manager, virtualization switch and storage device. Further, the management device holds information related to a snapshot image (a data copy at a certain point in time), which is acquired in the storage device as backup data, and a storage journal (for example, a journal comprising the date and time of an update, and the updated data). Furthermore, the management device holds a change history related to a DBMS setting, and information related to the storage destination of a log (archive log) prepared by the DBMS in the past.

When carrying out a DB recovery process, the management device, based on this information, determines recovery means appropriate for the storage configuration in accordance with the equipment capable of being used, and issues to respective elements of storage an indication for the construction (for example, either a restoration or a new construction) of a storage configuration for accessing data of a specified point in time. Further, the management device determines which snapshot image, storage journal, or archive log to use to carry out data recovery, and issues an indication to the storage device and DBMS to execute DB recovery processing utilizing this data.

DB data recovery methods include the following three types:
(i) complete recovery up to the storage configuration of the specified recovery time (complete recovery);
(ii) recovery in which the storage configuration physically differs slightly from that of the recovery time, but logical integrity is maintained;
(iii) preparation of a copy of DB data at recovery time, and construction (restoration) of a storage configuration that makes it possible to access this DB data by maintaining logical integrity (copy recovery).

Any one of these three types of recovery methods is selected as needed.

Furthermore, in this specification, when a program is the subject of a sentence, the CPU, which executes this program, actually executes processing in accordance with the program. Further, the following description is first and foremost an explanation of the embodiment, but needless to say the present invention also comprises a configuration equivalent to the following description.

This embodiment will be explained in detail below.

<Computer System Configuration>

FIG. 1 is a diagram showing an example of a constitution of a computer system of one embodiment of the present invention.

The computer system comprises a storage device 40; a computer (hereinafter, "server") 70 that uses the storage device 40; a computer (hereinafter, "management server") 120 for managing the computer system; and a virtualization switch 60 for storage area virtualization processing. Each of the devices comprises a network I/F 22, and is connected to a network 24 therethrough, enabling mutual communications.

Further, the server 70 and storage device 40 each comprise an I/O path I/F 32, and are connected to the I/O path I/F 32 of the virtualization switch 60 via a communication line (hereinafter I/O path) 34 therefrom. Here, the I/O path 34 connection port of the I/O path I/F 32 is called a port 36. I/O processing between the server 70 and the storage device 40 is carried out via this I/O path 34 and the virtualization switch 60. Furthermore, a communication line, which carries out data transmission between devices using different physical media and different protocols can be used as the I/O path 34. In this case, the virtualization switch 60 can perform the various types of protocol conversions. Further, the network 24 and I/O path 34 can also be the same communication line.

The storage device 40 comprises a CPU 12, memory 14, magnetic disk device (hereinafter "HDD") 16, network I/F 22 and I/O path I/F 32, and these are connected via an internal bus 18. Furthermore, there can either be one or a plurality of HDD 16. The memory 14, for example, comprises at least one of a nonvolatile area and a volatile area. In the following explanation, the memory 14 is treated as having both areas. Then, hereinafter the nonvolatile area shall be constituted by a ROM area (ROM (Read Only Memory)) and the volatile area shall be constituted by a RAM area (RAM (Random Access Memory)).

A control program 44, which is a program for controlling the storage device 40, is stored in the ROM area of the memory 14, and when this program 44 is run, it is moved to the RAM area and executed by the CPU 12. One part of the memory 14 is allocated to a cache memory area (data cache 42), which temporarily stores data in accordance with an access request (for example, a write request or a read request) from an external device (a device that exists outside of the storage device 40, for example, the server 70). By executing the control program 44, the storage device 40 is able to carry out a variety of processes and to realize various functions, both of which (processes and functions) will be explained hereinbelow.

The storage device 40 comprises either one or a plurality of logical disk devices (hereinafter, called LU, the abbreviation for Logical Unit) 208, which are created based on the physical storage area of the HDD 16, and provides same to an external device. Furthermore, the storage device 40 can comprise a flash memory device or other type of storage medium instead of an HDD 16, and therefore, the LU 208 can constitute another type of storage medium besides a logical disk device. The LU 208 can correspond one-to-one with an HDD 16, or it can correspond to a physical storage area constituted from a plurality of HDD 16. Also, one HDD 16 can correspond to a plurality of LU 208. The storage device 40 can dynamically carry out control (for example, create, delete or change the size (storage capacity)) of the LU 208, in other words, it can dynamically change the corresponding relationship between the LU 208 and the HDD 16. Furthermore, the storage device 40 can provide one LU 208 to an external device by way of a plurality of ports 36, and can dynamically change this setting as well. Further, the storage device 40 can comprise a function for dynamically changing the storage location of the LU 208 on the HDD 16 (can also migrate the LU 208 to a different HDD 16).

The storage device 40 comprises a snapshot function for acquiring a copy of data inside a LU set (one or more LU 208) of a certain specified point in time to another LU set (one or more LU 208) (Hereinafter, copy data (a copy of data) acquired by virtue of the snapshot function will be called a "snapshot image".). Further, the storage device 40 comprises a storage journal function for acquiring a data update history of a certain LU set (one or more LU 208) to another LU set (one or more LU 208) (Hereinafter, a data update history acquired by the storage device 40 will be called a "storage journal".). Also, the storage device 40 comprises a partition cache function for partitioning the data cache 42 into a plurality of areas, and managing this plurality of areas respectively as a single cache area (Hereinafter, the respective areas of the partitioned data cache 42 will be called partitioned cache 212.). The partitioned cache 212 into which data is temporarily stored can be determined in LU 208 units. The cache memory capacity (storage capacity) allocated to a partitioned cache 212 can be changed dynamically.

The storage device 40 is able to change a setting or execute a process in the storage device 40 (for example, set and/or execute the control of the LU 208 (create, delete or change size), the correspondence between the LU 208 and the port 36, the storage location of the LU 208 on the HDD 16, the snapshot function, the storage journal function, and the partition cache function) in accordance with an indication received from an external device via the network 24.

The virtualization switch 60 recognizes an LU 208 provided from the storage device 40 connected to this switch 60, and provides a virtual volume 206, which virtualizes this storage area (LU 208), to an external device. Furthermore, when the virtualization switch 60 is connected in multiple stages (when a plurality of virtualization switches 60 are connected cascadingly between an external device and the storage device 40), a virtual volume 206 provided by another virtualization switch 60 can be treated equivalently to a LU 208 provided from the storage device 40, making it possible to provide a virtual volume 206 to an external device. The virtualization switch 60 can dynamically carry out the control of a virtual volume 206 (for example, creation and deletion) in accordance with an indication received via the network 24 from an external device. Furthermore, the virtualization switch 60 can also comprise a function for dynamically changing the corresponding relationship of the storage area of an LU 208, which constitutes a virtual volume 206, and another virtual volume 206. Furthermore, this change of corresponding relationship, for example, is of two types, one that involves a data copy, and one that does not involve a data copy. Further, this change can include the changing of the size (storage capacity) of either a virtual volume 206, or a LU 208, which constitutes this virtual volume 206.

The server 70 comprises a CPU 12, memory 14, HDD 16, network I/F 22, and I/O path I/F 32, and these are connected by an internal bus 18. For example, an operating system (OS)

72 and management agent 160 are written to the memory 14 from the HDD 16. The read-in OS 72 and so forth are executed by the CPU 12.

The OS 72 is a group of computer-executed programs for carrying out program execution control, hardware control, and basic processing, and, for example, comprises a volume manager 78 and a file system 80. Furthermore, in this FIG. 1, the server 70 only comprises one file system 80, but it can comprise a plurality of file systems 80.

The volume manager 78 is a program comprising a function for creating a logical volume 204 from the storage area of a virtual volume 206, and providing this logical volume 204 to the file system 80. Furthermore, the volume manager 78 can dynamically control the logical volume 204 (for example, creation and deletion). In addition, the volume manager 78 can also comprise a function for dynamically changing the corresponding relationship of the storage area of the virtual volume 206, which constitutes the logical volume 204. This changing of the corresponding relationship is one of two types: involving a data copy, or not involving by a data copy. This change can also comprise a change in size of either the logical volume, or the virtual volume 206, which constitutes this logical volume 204. The volume manager 78 can execute the above-described processing in accordance with an indication from outside, which is carried out through a software interface of this manager 78.

The file system 80 is a program comprising a function for creating a file 202 from the storage area of the logical volume 204, and providing this file 202 to another program. Furthermore, in the following explanation, a raw device function (a function for directly accessing a storage area in at least one of the logical volume 204, virtual volume 206, and LU 208) shall be realized by the file system 80 using the same software interface as that for accessing a file 202. Further, a function for using the storage area of the logical volume 204 by partitioning same into a plurality of areas shall be realized by the file system 80 (A partitioned storage area of the logical volume 204 is called a "partition".).

The management agent 160 is a program that is executed when relaying an indication, which is sent from a management program 140 via a network 24 to the volume manager 78, file system 80 or DBMS 90. The management agent 160 can, as needed, acquire various information, which the volume manager 78, file system 80 or DBMS 90 either generate or manage internally, and send the acquired various information to the management program 140 via the network 24. Further, in order for a DBMS setting information modification process (process for modifying the information set in the DBMS 90), an area securing process and an initialization process, which are implemented during a DB recovery process, to be executed, the management agent 160 must carry out the relaying of an indication (when needed, the execution of a command).

The DBMS 90 is a program, which is executed when the server 70 executes processing related to the DB (including management). This program is read into memory 14 from a storage device 40 and executed by the CPU 12. In this embodiment, a DBMS 90 execution program file and a setting file, which records the setting information of a DB, are stored in a predetermined format under a specified directory (hereinafter, "DBMS system directory") provided by the file system 80, and the pathname to this directory is specified by an environment variable when executing the DBMS 90 execution program. A plurality of DBMS system directories can exist. Also, a DBMS 90 identifier, and, as needed, a network setting can be specified simultaneously by an environment variable. A plurality of DBMS 90 can also be executed on a single server 70. Further, a plurality of DBMS 90 running on a plurality of servers 70 can be coordinated, and operated logically as a single DBMS in a "cluster configuration". In this case, cluster configuration information, which is management information related to a cluster configuration, can be held in the DBMS system directory. Further, there can also be a DBMS system directory that is shared between DBMS 90.

The DBMS 90 comprises a software interface for receiving the settings of various functions. The DBMS 90 treats a DB data update history as a log, and stores same in an area that is independent of DB data. An old log is not directly used by the DBMS 90, but rather is used by restoring DB data at a certain point in time based on DB data, which has been backed up (hereinafter, backup DB data). A log like this is called an "archive log" in this embodiment. An archive log is not subject to management by the DBMS 90, and is stored in a different area from that of a log. The process for converting a log to an archive log can be carried out by an arbitrary program comprising the DBMS 90 in accordance with an indication from an administrator, or it can be automatically carried out by the DBMS 90.

The DBMS 90 stores a table, index, log and so forth (hereinafter, these may be referred to generically as "objects"), which are DB data that the DBMS 90 itself manages and utilizes, in a storage device 40. The DBMS 90 creates a "table space", which groups together files 202 that the file system 80 provides, and manages the storage area for its own use. One or more objects 222 are allocated to a table space.

The OS 72, DBMS 90 and management agent 160 are read out from a CD-ROM (portable storage medium), which stores these programs, using a CD-ROM drive 20 of the management server 120, and are installed via the network 24 in either an HDD 16 inside a server 70 or in a storage device 40. These programs may also be installed by another method (for example, downloaded via the Internet). This is the same for the management server 120 and other devices as well.

The management server 120 comprises a CPU 12, memory 14, HDD 16, CD-ROM drive 20, and network I/F 22, which are interconnected via an internal bus 18. The OS 72 and management program 140 are read into the memory 14 from the HDD 16, and executed by the CPU 12. The CD-ROM drive 20 is utilized to install the various programs.

A management terminal 110, which comprises a keyboard, mouse and other such input devices 112, and a display screen 114, is connected to the management server 120 via the network 24. The management server 120 and the management terminal 110 can also be connected using a communication line that is different from the network 24, and the management server 120 and management terminal 110 can also be integrated together. As a rule, an administrator performs the input and output of information and a control indication via the management terminal 110, and can also utilize the CD-ROM drive 20 as needed.

The management program 140 is a program, which is executed by the management server 120 when carrying out an indication and so forth for a DB recovery process. The management program 140 carries out a processing indication for a storage device 40, virtualization switch 60, volume manager 78, file system 80, and DBMS 90 as needed. At this time, indications are sent to a storage device 40 and virtualization switch 60 via the network 24, and indications are sent to the volume manager 78, file system 80 and DBMS 90 via the network 24 and the management agent 160.

The management program 140 holds configuration history information 142 (history information related to the respective configurations of a storage device 40, virtualization switch 60, volume manager 78, file system 80 and DBMS 90), backup data information 144 (information related to the state of a storage device 40 acquired by a snapshot image or storage journal, and the state of the DBMS 90 acquired by an archive log), and free resource information 146 (information related to a storage area inside an HDD 16 capable of storing new data in a storage device 40, and a server 70 capable of executing a new DBMS 90). The management program 140 can store the configuration history information 142, backup data information 144, and free resource information 146 in an HDD 16 inside the management server 120 or in a storage device 40 as needed.

Details concerning the operation of the management program 140 will be described below. The management program 140 is read out from a CD-ROM using the CD-ROM drive 20 of the management server 120, and installed in the HDD 16.

The constitution of a computer system is explained hereinabove. Furthermore, the above-mentioned constitution is one example, and a computer system need not be limited to the above-mentioned constitution.

<<Data Mapping Hierarchy Configuration>>

Figure 2:
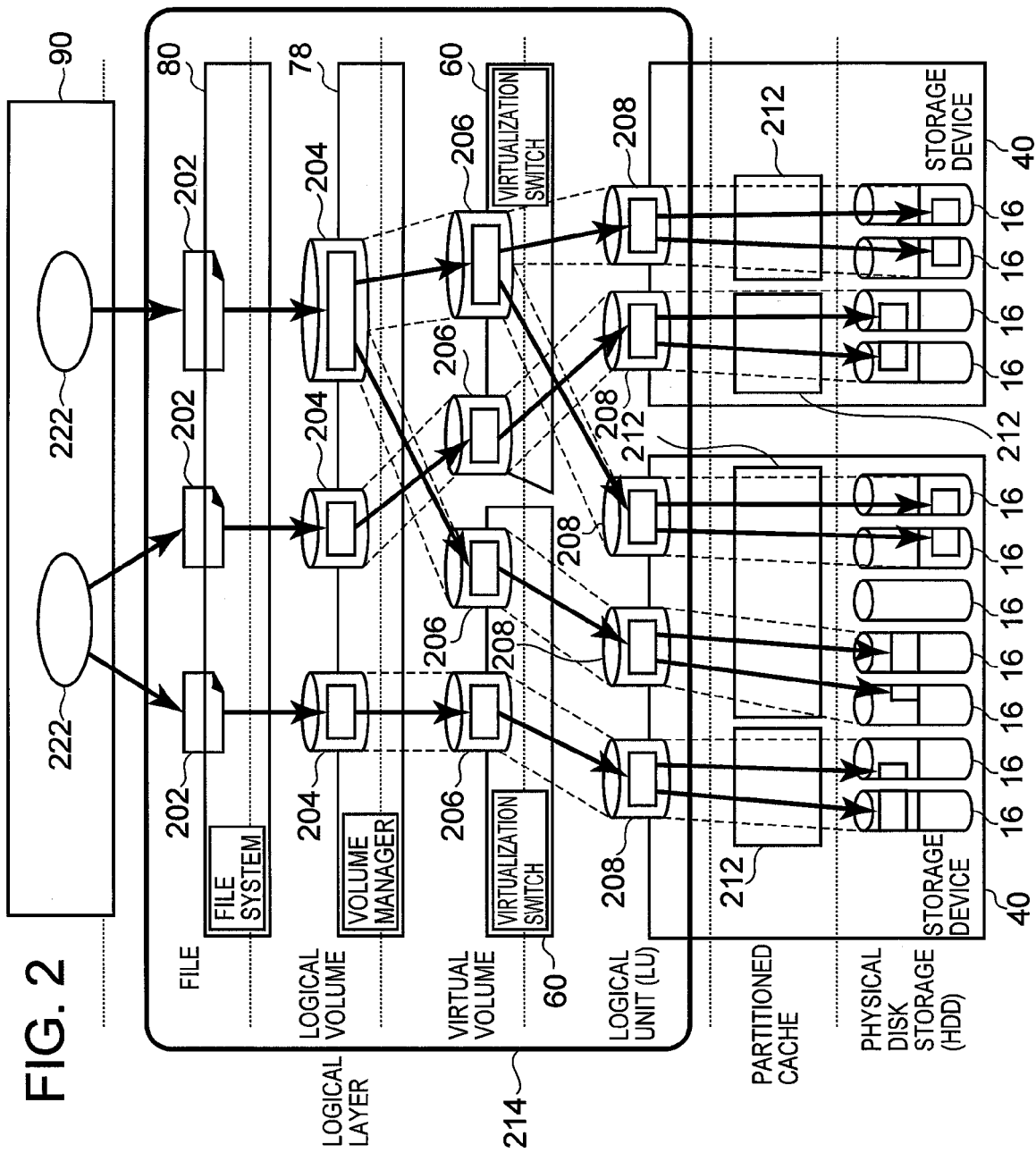
FIG. 2 is a diagram illustrating a data mapping hierarchy constitution of DB data managed by a DBMS 90.

FIG. 2 is a diagram illustrating a data mapping hierarchy configuration of DB data managed by a DBMS 90.

A situation in which a single virtualization switch 60 exists between a server 70 and a storage device 40 is given as an example and explained. For the following two hierarchies, the side near the DBMS 90 (the application side) will be referred to as the "higher level" hierarchy, and the side near the HDD 16 (the physical storage area side) will be referred to as the "lower level" hierarchy. A file 202, logical volume 204, virtual volume 206 and LU 208 may be referred to collectively as a "virtual structure", and a virtual structure plus an HDD 16 may be referred to collectively as a "management structure". That is, a "management structure" as explained in this embodiment comprises a "virtual structure".

In the example shown in FIG. 2, the DBMS 90 accesses a file 202 (a file 202 provided by the file system 80), which stores an object 222 that the DBMS 90 manages. The file system 80 converts the access to the file 202 to an area (an area of a logical volume 204), which corresponds to this file 202. The volume manager 78 converts the access to the area of the logical volume 204 to an access to an area of a virtual volume 206, which corresponds to the area thereof. The virtualization switch 60 converts the access to the area of the virtual volume 206 to an access to an area of an LU 208, which corresponds to the area thereof. A storage device 40 converts the access to the area of the LU 208 to an access to an area of an HDD 16, which corresponds to the area thereof. That is, according to this data mapping hierarchy configuration, data provided in the higher-level hierarchy (data in the virtual structure) is mapped to one or more storage areas, which exist in the lower-level hierarchy (a storage area in the management structure). Further, a corresponding partitioned cache 212 is stipulated for each LU 208 inside the storage device 40.

Further, although not shown in the figure, the same part of data in a certain virtual structure can be mapped to a storage area in a lower-level hierarchy than this same part (for example, an area in an HDD 16). Further, the data of a certain virtual structure can be mapped to an area of the HDD 16 using a plurality of paths.

In this embodiment, the corresponding relationship of data can be clarified between management structures in the logical layer 214 without the volume manager 78 being used by a server 70 (There can be a logical volume 204 that is fixed one-to-one to a virtual volume 206.). There can be a plurality of stages of virtualization switches 60. A switch, which is equivalent to a virtualization switch 60, need not comprise a storage area virtualization function, and, in this case, the virtualization switch 60 can be treated as providing a storage area, which is provided from the lower-level hierarchy, as-is to the higher-level hierarchy. A server 70 and storage device 40 can be directly connected via an I/O path 34 without a virtualization switch 60, and, in this case, the I/O path 34 can be treated as comprising a switch (without a virtualization function), which is connected only to the corresponding server 70 and storage device 40.

<<Data Structure>>

Figure 3:
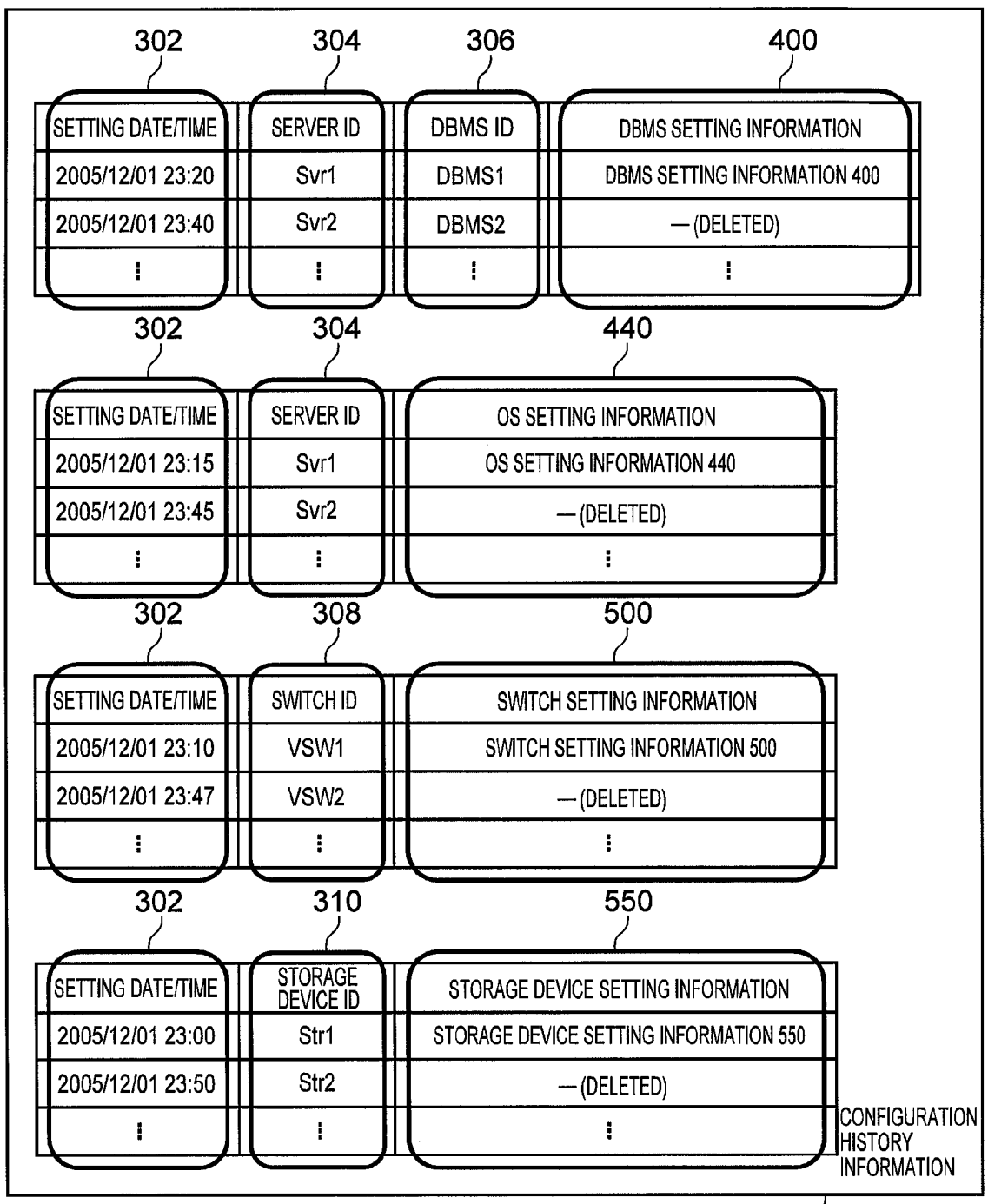
FIG. 3 is a schematic view showing an example of a data structure of configuration history information 142.

FIG. 3 is a schematic diagram showing an example of a data structure of configuration history information 142.

Configuration history information 142 is data held and managed by the management program 140, and comprises the following data.

A first data is history information of setting changes related to a DBMS 90, and comprises a set with an entry for holding a setting date/time 302, which is the date and time at which a setting was changed; an entry for holding a server ID 304, which is the identifier of the server that runs the DBMS 90 in which a configuration was changed; an entry for holding a DBMS ID 306, which is the identifier of this DBMS 90; and an entry comprising DBMS setting information 400 of the DBMS 90 subsequent to a configuration being changed (will be explained hereinbelow). Furthermore, if the DBMS 90 is deleted, a null value indicative thereof is stored in the entry comprising the DBMS setting information 400. Furthermore, when a DBMS constitutes a cluster configuration, there is a set in which the DBMS ID 306 has the same value, but the server ID 304 is different.

A second data is history information of a configuration setting change related to the OS 72 running on a server 70, and comprises a set with an entry for holding a setting date/time 302, which is the date and time at which a configuration was changed; an entry for holding the server ID 304 of the server 70 that runs the OS 72 in which a configuration has been changed; and OS setting information 440 related to the OS 72 subsequent to a configuration being changed (will be explained hereinbelow). Furthermore, when the server 70 is deleted, a null value indicative thereof is stored in the entry comprising the OS setting information 440.

A third data is history information of configuration setting changes related to a virtualization switch 60, and comprises a set with an entry for holding a setting date/time 302, which is the date and time at which a configuration was changed; an entry for holding the switch ID 308, which is the identifier of the virtualization switch 60 in which a configuration has been changed; and switch setting information 500 related to the virtualization switch 60 subsequent to a setting being changed (will be explained hereinbelow). Furthermore, if the virtualization switch 60 is deleted, a null value indicative thereof is stored in the entry comprising the switch setting information 500.

A fourth data is history information of configuration setting changes related to a storage device 40, and comprises a set with an entry for holding a setting date/time 302, which is the date and time at which a configuration was changed; an entry for holding the storage device ID 310, which is the identifier of the storage device 40 in which a configuration has been changed; and storage device setting information 550 related to the storage device 40 subsequent to a configuration being changed (will be explained hereinbelow). Furthermore, if the storage device 40 is deleted, a null value indicative thereof is stored in the entry comprising the storage device setting information 550.

Figure 4:
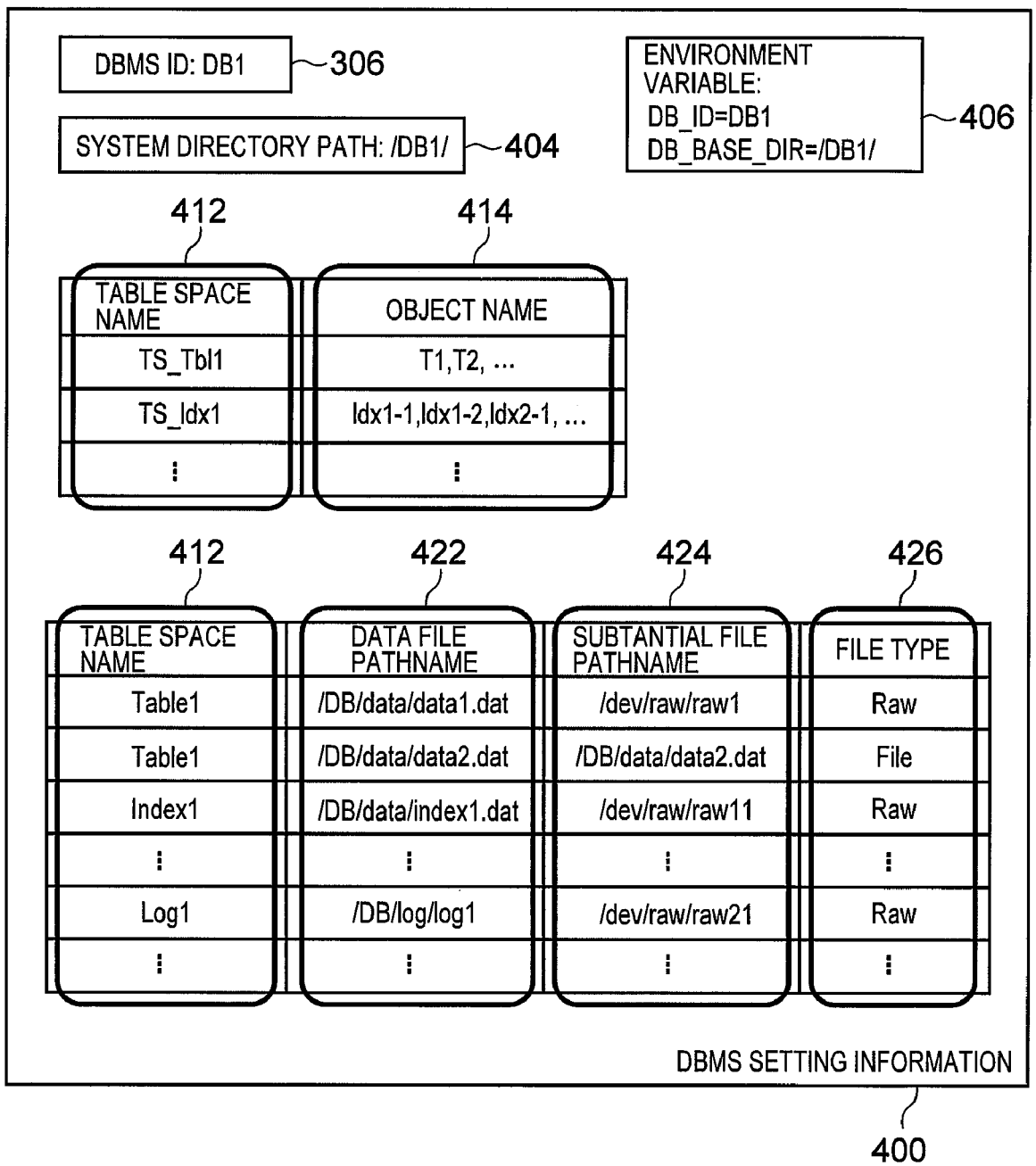
FIG. 4 is a schematic view showing an example of a data structure of DBMS setting information 400.

FIG. 4 is a schematic diagram showing an example of a data structure of DBMS setting information 400.

DBMS setting information 400 is information, which comprises configuration history information 142, and which is related to a configuration setting at a certain point in time in a DBMS 90, and comprises the following data.

First, DBMS setting information 400 comprises an entry for holding a DBMS ID 306, which is the identifier of the DBMS 90; an entry for holding a system directory path 404, which is the pathname of the DBMS system directory of the DBMS 90; and an entry for holding an environment variable 406, which is set when executing the DBMS 90. Among the environment variables 406 there is included an environment variable for setting the identifier of the DBMS 90. The system directory path 404 can also comprise information to a plurality of DBMS system directories.

Further, DBMS setting information 400 comprises a set with an entry for holding an object name 414, which is an identifier of an object 222; and an entry for holding a table space name 412, which is the identifier of a table space in which this object 222 is stored. Furthermore, DBMS setting information 400 comprises an entry comprising a table space name 412; an entry for holding a data file pathname 422, which is the pathname of a file 202 corresponding to the table space thereof; when the pathname indicated by the data file pathname 422 is a symbolic link, an entry for holding a substantial file pathname 424 obtained by analyzing the symbolic link thereof; and an entry for holding a file type 426. When the pathname indicated by the data file pathname 422 is not a symbolic link, the same value as the data file pathname 422 is held in the entry that holds the substantial file pathname 424. Further, the file type 426 indicates the type of a file, and as the value thereof, "File" is stored in the case of an ordinary file, and "Raw" is stored when the file type is the result of a raw device function.

FIG. 5 is a schematic diagram showing an example of a data structure of OS setting information 440.

OS setting information 440 is information which comprises configuration history information 142, and which is related to a configuration setting at a certain point in time of an OS 72, and comprises the following data.

First, OS setting information 440 comprises a set with an entry for holding a logical volume ID 452, which is the identifier of a logical volume 204; an entry for holding a partition ID 454, which is the identifier of a partition, which partitions the logical volume 204 thereof; an entry for holding a block number 456, which shows the storage area inside the logical volume 204 corresponding to the partition thereof; an entry for holding a mount point 458 of a file system constructed in the partition to which the file system 80 corresponds; and an entry for holding a raw device pathname 460 for the raw device mechanism of the partition thereof. When a file system is not constructed in a partition, the mount point 458 takes a null value. Further, when a raw device mechanism is not used in a partition, the raw device pathname 460 takes a null value.

Further, OS setting information 440 comprises a set with an entry for holding a logical volume ID 452; an entry for holding a higher-level block number 462 showing the storage area of the logical volume 204 thereof; an entry for holding a switch ID 464, which is the identifier of the virtualization switch 60 providing the virtual volume 206 corresponding to this storage area; an entry for holding a lower-level volume ID 466, which is the identifier of this virtual volume 206; and an entry for holding a lower-level block number 468 showing the storage area inside the corresponding virtual volume 206.

Furthermore, for the respective ports 36 of the I/O path I/F 32 comprising a server 70, OS setting information 440 also holds a set with an entry for holding a receiving port ID 472, which is the identifier of a port 36; an entry for holding the switch ID 464 of the virtualization switch 60 to which this port 36 is connected via the I/O path 34; and an entry for holding a lower-level volume ID 466 showing this virtual volume 206, when a virtual volume 206 for implementing an I/O process via this port 36 exists. When a virtualization switch 60 and I/O process are not implemented via this port 36, the entry, which holds the lower-level volume ID 466, takes a null value.

Figure 6:
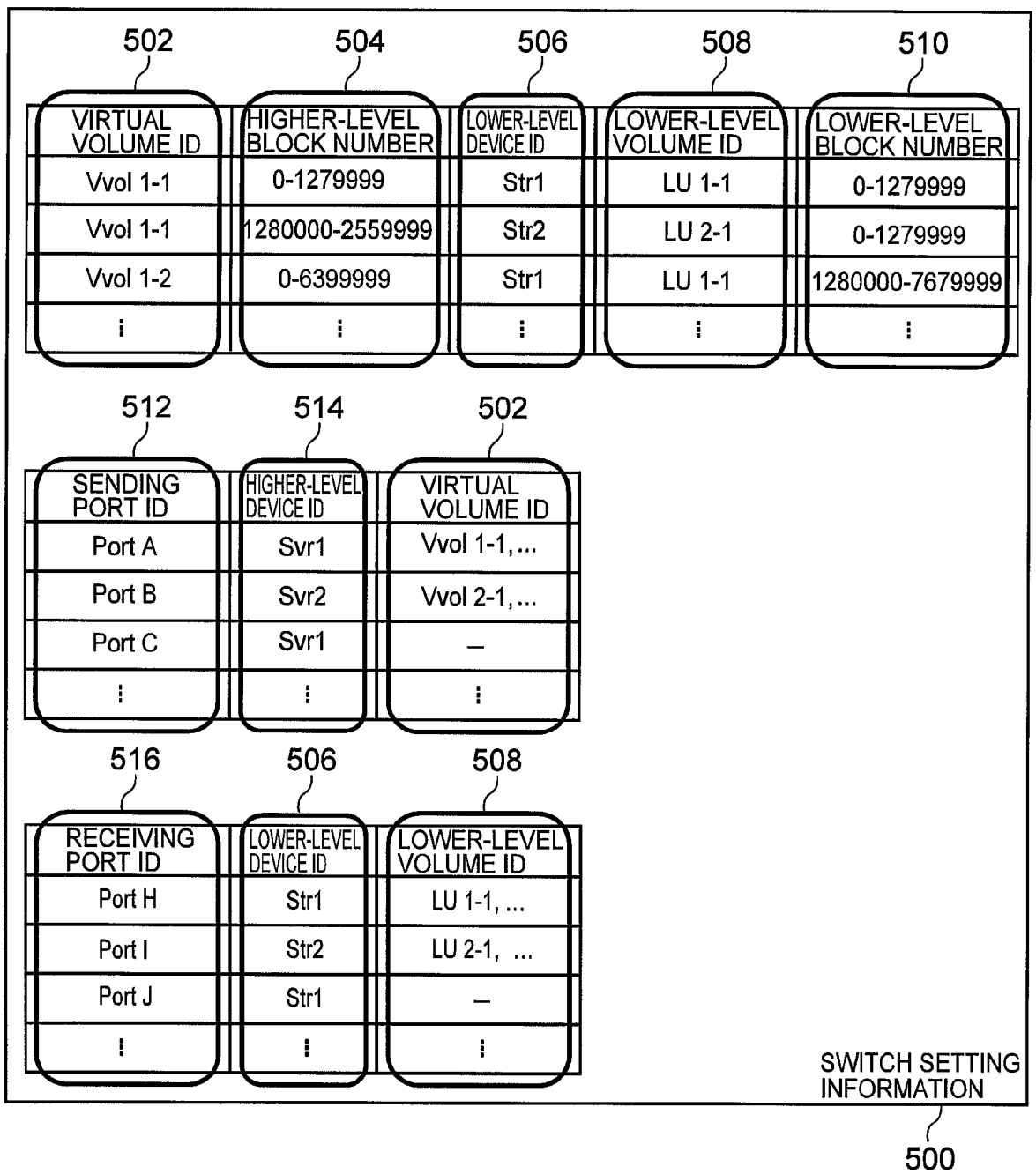
FIG. 6 is a schematic view showing an example of a data structure of switch setting information 500.

FIG. 6 is a schematic diagram showing an example of a data structure of switch setting information 500.

Switch setting information 500 is information, which comprises configuration history information 142, and which is related to a configuration setting at a certain point in time of a virtualization switch 60, and comprises the following data.

First, switch setting information 500 comprises a set with an entry for holding a virtual volume ID 502, which is the identifier of a virtual volume 206 that a virtualization switch 60 provides; an entry for holding a higher-level block number 504 showing a storage area of this virtual volume 206; an entry for holding a lower-level device ID 506, which is the identifier of a storage device 40 (or a virtualization switch 60) that provides the LU 208 (or virtual volume 206) corresponding to this storage area; an entry for holding a lower-level volume ID 508, which is the identifier of this LU 208 (or virtual volume 206); and an entry for holding a lower-level block number 510 showing a storage area inside the corresponding LU 208 (or virtual volume 206).

Further, for a port 36 of an I/O path I/F 32 comprising a virtualization switch 60, the following information is included. That is, as the connection relationship with a device capable of providing a virtual volume 206 (a server 70 or a virtualization switch 60), switch setting information 500 comprises a set with an entry for holding a sending port ID 512, which is the identifier of the port 36 corresponding to the I/O path 34 connected to this device; an entry for holding a higher-level device ID 514, which is the identifier of a device to which this port 36 is connected via the I/O path 34; and an entry for holding a virtual volume ID 502 showing the virtual volume 206 provided via this port 36. When a virtual volume 206 is not provided via this port 36, the entry, which holds the virtual volume ID 502, takes a null value.

Furthermore, as the connection relationship with a LU 208 used to constitute a virtual volume 206, or a device capable of acquiring a virtual volume 206 (a storage device 40 or a virtualization switch 60), switch setting information 500 comprises a set with an entry for holding a receiving port ID 516, which is an identifier of the port 36 corresponding to the I/O path 34 connected to this device; an entry for holding a lower-level device ID 506, which is the identifier of the device to which this port 36 is connected via the I/O path 34; and an entry for holding a lower-level volume ID 508 showing a LU 208 or virtual volume 206 acquired via this port 36. When a LU 208 or virtual volume 206 is not acquired via this port 36, the entry, which holds the lower-level volume ID 508, takes a null value.

Figure 7:
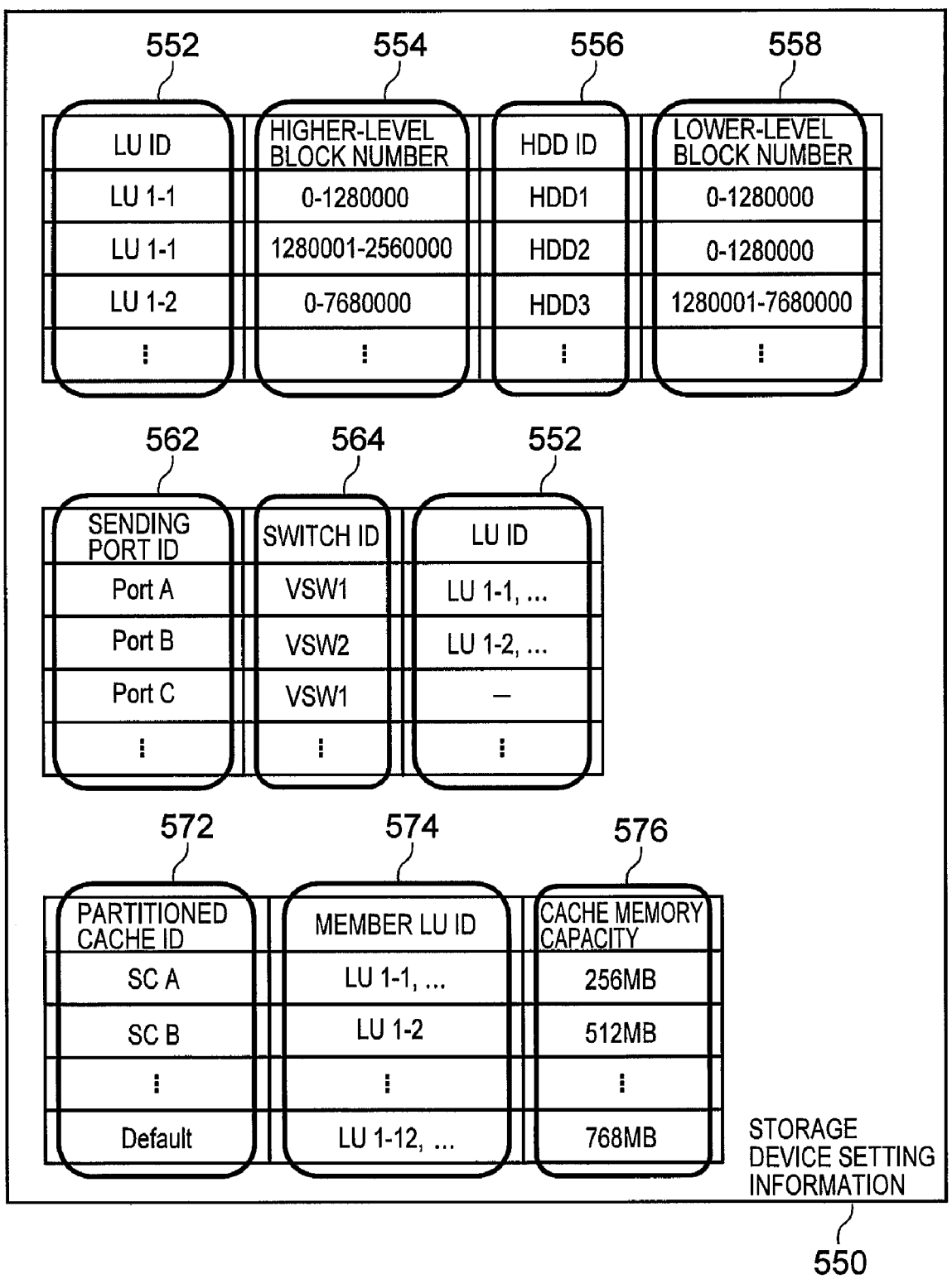
FIG. 7 is a schematic view showing an example of a data structure of storage device setting information 550.

FIG. 7 is schematic diagram showing an example of a data structure of storage device setting information 550.

Storage device setting information 550 is information, which comprises configuration history information 142, and which is related to a storage device 40 configuration setting at a certain point in time, and comprises the following data.

First, storage device setting information 550 comprises a set with an entry for holding a LU ID 552, which is the identifier of an LU 208 that a storage device 40 provides; an entry for holding a higher-level block number 554 showing a storage area of a LU 208; an entry for holding an HDD ID 556, which is the identifier of the HDD 16 corresponding to this storage area; and an entry for holding a lower-level block number 558 showing the corresponding storage area inside the HDD 16.

Further, for the respective ports 36 of the I/O path I/F 32 that the storage device 40 holds, storage device setting information 550 holds a set with an entry for holding a sending port ID 562, which is the identifier of a port 36; an entry for holding a switch ID 564, which is the identifier of the virtualization switch 60 to which this port 36 is connected via the I/O path 34; and an entry for holding a LU ID 552 showing the LU 208 provided via this port 36. When an LU 208 is not provided via this port 36, the entry, which holds the LU ID 552, takes a null value.

Furthermore, as the settings of a partitioned cache 212, storage device setting information 550 comprises a set with an entry for holding a partitioned cache ID 572, which is the identifier of a partitioned cache 212; an entry for holding a member LU ID 574, which holds the identifier of the LU 208 corresponding to this partitioned cache 212; and an entry for holding cache memory capacity 576 allocated to a partitioned cache 212. Furthermore, a partitioned cache 212 for which the value of the partitioned cache ID 572 is "Default" (hereinafter "default partitioned cache") is allocated as an initial value when the allocation of an LU 208 to a specific partitioned cache 212 is not indicated.

FIG. 8 is a schematic view showing an example of a data structure of backup data information 144.

Backup data information 144 is data, which the management program 140 holds and manages, and comprises information related to a snapshot image, storage journal and archive log of the current point in time.

As information related to a snapshot image, backup data information 144 comprises a set with an entry for holding a storage device ID 612 showing the storage device 40 that acquired the snapshot image; an entry for holding a base LU ID 614 showing a LU set (one or more LU 208) constituting the acquisition target of the snapshot image; an entry for holding a snapshot LU ID 616 showing a LU set (one or more LU 208) constituting the acquisition destination of the snapshot image; and an entry for holding a snapshot image acquisition time 618.

As information related to a storage journal, backup data information 144 comprises a set with an entry for holding a storage device ID 662 showing the storage device that acquired the data update history; an entry for holding an acquisition target LU ID 624 showing a LU set (one or more LU 208) constituting the update history acquisition target; an entry for holding a journal LU ID 626 showing a LU set (one or more LU 208) for storing the acquired update history; and an entry for holding a journal acquisition period 628 showing the acquisition period of the update history. With regard to the journal acquisition period 628, the entry holds the start time and end time, and when an update history is currently in the process of being acquired, the entry holds a null value for the end time.

As information related to an archive log, backup data information 144 holds a set with an entry for holding a DBMS ID 642 showing the DBMS 90 that generated an archive log; an entry for holding a log period 644 showing the period that this log was generated (time, process sequence number, and so forth); and an entry for holding an archive destination 646. The archive destination 646 is information related to the area in which the archive log is stored. For this embodiment, an archive log corresponding to the log period 644 in a certain DBMS 90 will be explained as being stored inside a single LU 208. In this case, the respective identifiers of the LU 208 in which the archive log is stored, and the storage device 40 that provides this LU 208, plus information related to a storage destination inside the LU 208 are held in the archive destination 646. When the archive log is to be stored as a file 202, for example, the partition and file pathname of this file 202 (in the file system created on the LU 208) are held as this storage destination, and when the archive log is stored using a raw device function, the block number of the storage destination is held in the archive destination 646. Furthermore, an archive log can also be split and stored in a plurality of LU 208, and in this case, the archive destination 646 can comprise configuration information of archive log storage areas by virtue of a plurality of LU 208.

Figure 9:
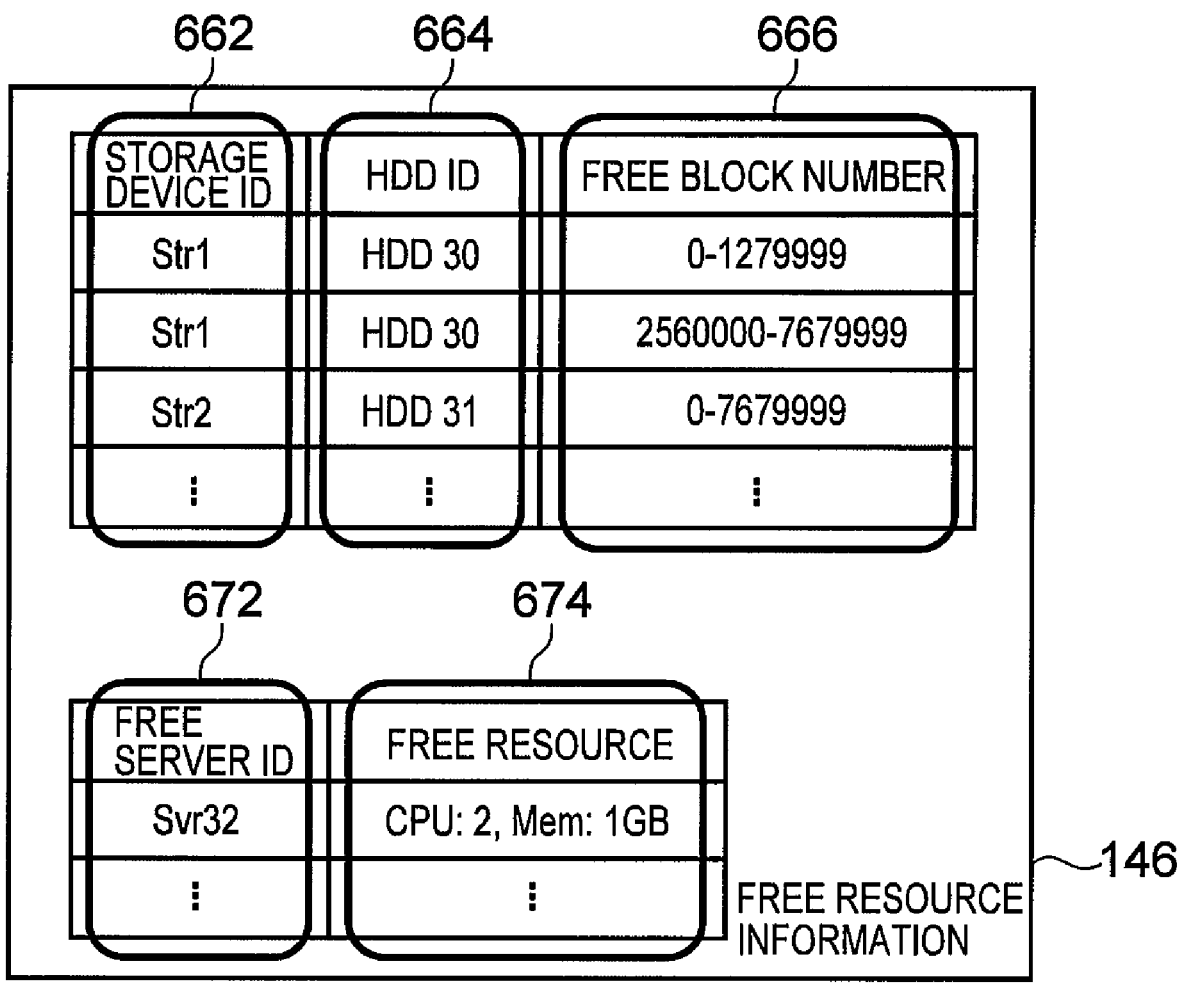
FIG. 9 is a schematic view showing an example of a data structure of free resource information 146.

FIG. 9 is a schematic diagram showing an example of a data structure of free resource information 146.

Free resource information 146 is data, which the management program 140 holds and manages, and comprises information related to an unallocated storage area in an HDD 16 inside a storage device 40 at the current point in time (a storage area that has yet to be allocated anywhere in the data mapping hierarchy structure), as well as information related to a server 70 capable of adding and running a DBMS 90.

As information related to an unallocated storage area in an HDD 16 inside a storage device 40, free resource information 146 holds a set with an entry for holding a storage device ID 662 showing a storage device 40; an entry for holding an HDD ID 664 showing an HDD 16; and an entry for holding a free block number 666 showing an unallocated area inside this HDD 16.

As information related to a server 70 capable of adding and running a DBMS 90, free resource information 146 comprises a set with an entry comprising a free server ID 672, which shows such a server 70; and an entry comprising a free resource 674, which holds information related to the number of new CPUs and memory capacity (storage capacity) capable of being used in this server.

<<Method for Changing a Storage Configuration>>

In this embodiment, a storage configuration (the corresponding relationship from a logical volume 204 to a storage area in a HDD 16 inside a storage device 40) is changed dynamically. A method for changing a storage configuration will be explained here using a number of examples.

Figure 10:
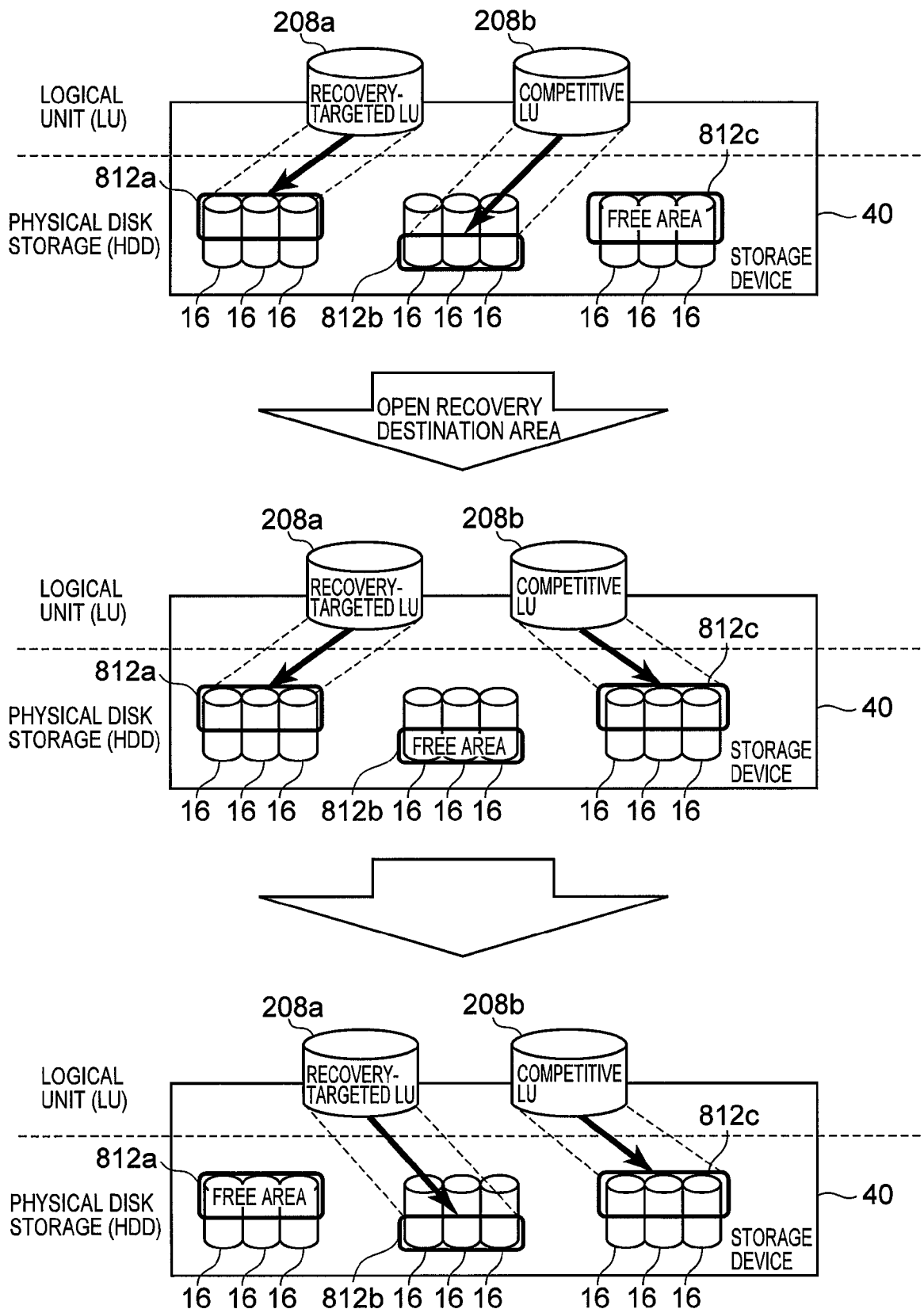
FIG. 10 is a diagram showing a first example of a method for changing a storage configuration.

FIG. 10 is a diagram showing a first example of a method for changing a storage configuration.

In this example, there is explained a process in which inside a storage device 40 there is a LU 208a (hereinafter recovery-targeted LU 208a), which is to be restored to a recovery time storage location (a storage location on a HDD 16), and when data inside the other LU 208b (hereinafter, competitive LU 208b) is stored in this storage location (storage location on the HDD 16) at recovery time, the recovery time storage location (hereinafter, recovery location) is made into a free area, and the recovery-targeted LU 208a is recovered to this storage location.

At processing start time, the data of the recovery-targeted LU 208a is stored in area 812a on the HDD 16. The recovery location is area 812b, but the data of competitive LU 208b is currently stored in area 812b (LU 208b currently exists in the recovery location and constitutes an obstacle, and thus, in this sense, is called a "competitive LU".). Further, it is a state in which area 812c exists as a free area, enabling data to be stored there anew.

First, in order to free up recovery location 812b so as to enable the data of recovery-targeted LU 208a to be stored in recovery location 812b, for example, the management program 140 issues an indication to the storage device 40 to change the storage location of the competitive LU 208b data to area 812c. Accordingly, the control program 44 of the storage device 40 moves the data inside the recovery location 812b to area 812c, and consequently recovery location 812b becomes a free area.

Thereafter, for example, the management program 140 issues an indication to the storage device 40 to change the storage location of the recovery-targeted LU 208a data to the recovery location 812b. The control program 44 migrates the data of the recovery-targeted LU 208a to the recovery location 812b. Furthermore, area 812a becomes a free area by virtue of this process.

Figure 11:
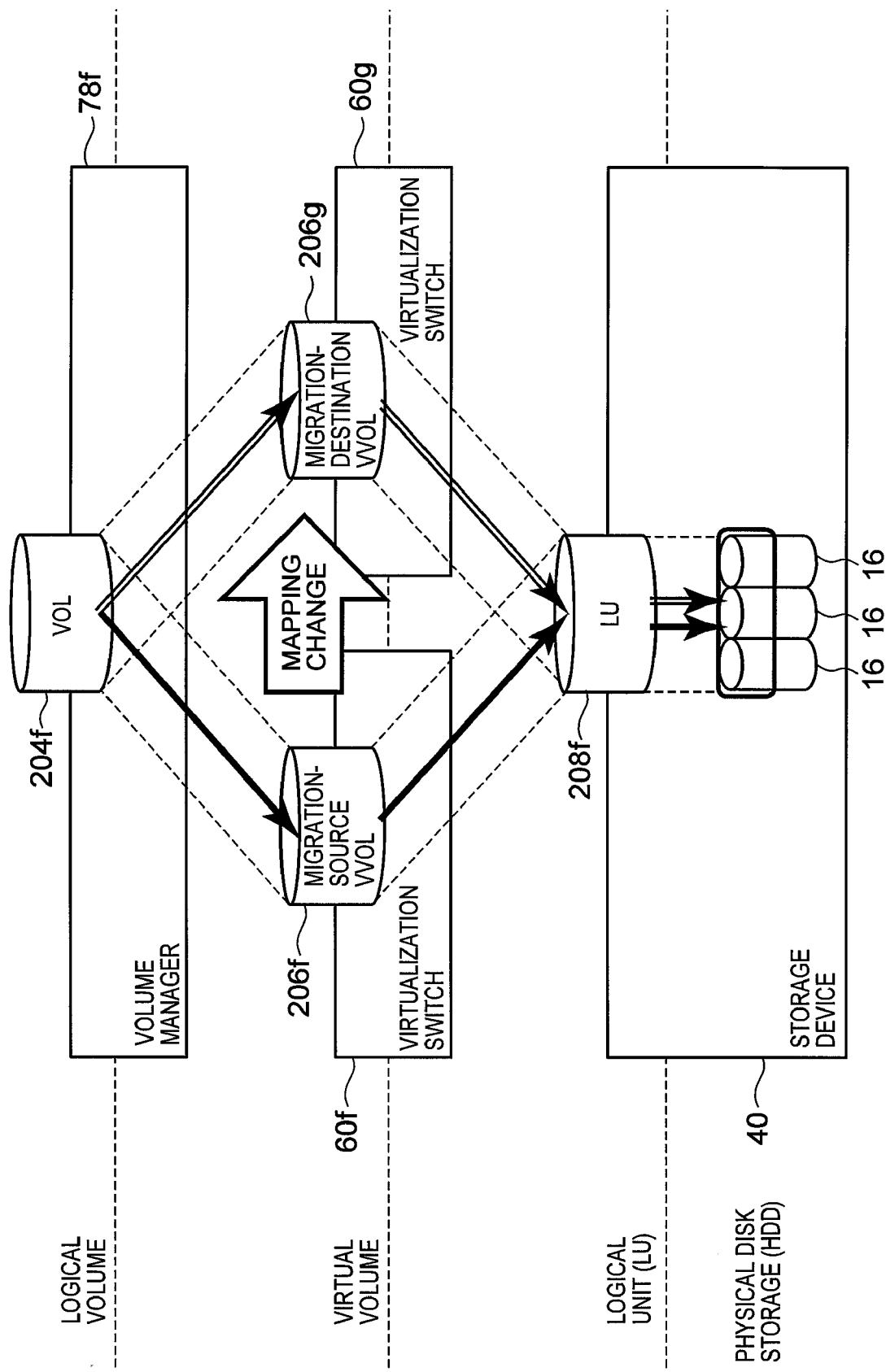
FIG. 11 is a diagram showing a second example of a method for changing a storage configuration.

FIG. 11 is a diagram showing a second example of a method for changing a storage configuration.

In this example, there is explained a process which does not change a LU 208f, in which the data of a logical volume 204f targeted for processing is stored, but rather changes a storage configuration so that I/O processing that has been carried out via virtualization switch 60f is carried out via virtualization switch 60g (that is, via a different I/O path 34).

First, for example, the management program 140 issues an indication to the storage device 40 to change the corresponding relationship between LU 208f and port 36 such that LU 208f can be accessed from the virtualization switch 60g. Thereafter, for example, the management program 140 issues an indication to the virtualization switch 60g to create a migration-destination virtual volume 206g of the same configuration as the migration-source virtual volume (VVOL) 206f, which the virtualization switch 60f provides using the LU 208f, and which the volume manager 78f uses as a component of the logical volume (VOL) 204f. Next, for example, the management program 140 issues an indication to the virtualization switch 60g to provide the migration-destination virtual volume 206g to the server 70 on which the volume manager 78f is running. Next, for example, the management program 140 issues an indication to the volume manager 78f to constitute the logical volume 204f from the migration-destination virtual volume 206g without the migration-source virtual volume 206f. This change indication is a configuration change indication that does not involve a data copy. Finally, for example, the management program 140 as needed issues an indication to the virtualization switch 60f to delete the migration-source virtual volume 206f, and thereafter, issues an indication to the storage device 40 to change the corresponding relationship of the LU 208f and the port 36 such that virtualization switch 60f can no longer access LU 208f.

The processing procedure described in this example can be applied in a case in which either a portion of the storage area of the logical volume 204f corresponds to the migration-source virtual volume 206f, or the entire storage area corresponds to the migration-source virtual volume 206f. Furthermore, when the logical volume 204f constitutes a plurality of virtual volumes 206, this process is independently implemented for all the virtual volumes 206 targeted for change, respectively.

Figure 12:
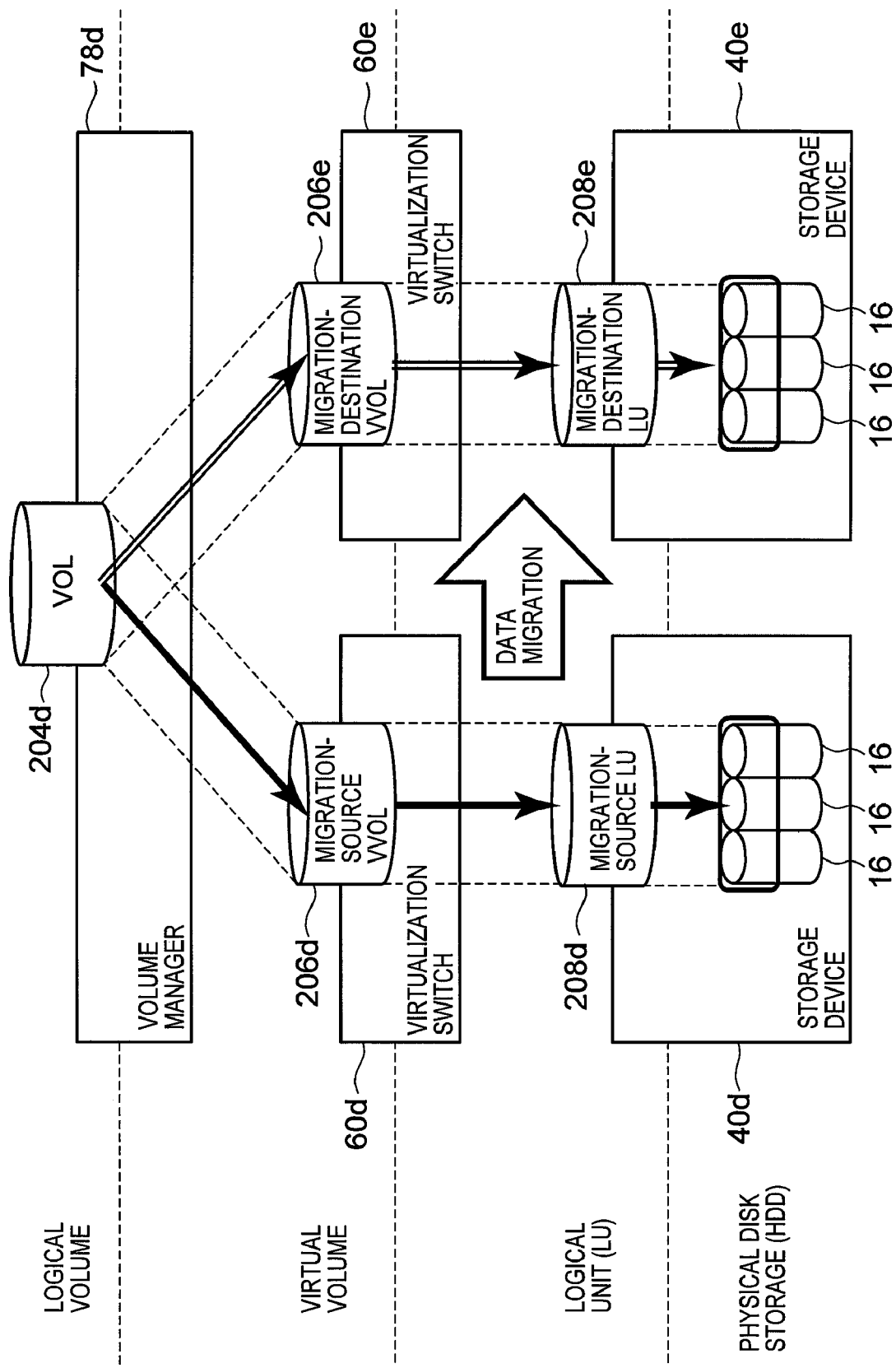
FIG. 12 is a diagram showing a third example of a method for changing a storage configuration.

FIG. 12 is a diagram showing a third example of a method for changing a storage configuration.

In this example, there is explained a process for changing the data storage location of a logical volume 204d in the volume manager 78d by copying from a migration-source LU 208d provided by storage device 40d to a migration-destination LU 208e provided by storage device 40e. Similarly, a configuration change involving a copy can be implemented using a migration-destination LU in a virtualization switch 60.

First, when a migration-destination LU 208e does not exist, for example, the management program 140 issues an indication to the storage device 40e to create a migration-destination LU 208e having the same capacity as the migration-source LU 208d. Thereafter, for example, the management program 140 issues an indication to the storage device 40e to change the corresponding relationship between the LU 208e and the port 36 such that the migration-destination LU 208e is accessible from the virtualization switch 60e. Next, for example, the management program 140 issues an indication to the virtualization switch 60e to use the migration-destination LU 208e to create a migration-destination virtual volume 206e of the same configuration as the migration-source volume 206d, which the virtualization switch 60d provides using the migration-source LU 208d, and which the volume manager 78d uses as a component of the logical volume 204d. Thereafter, for example, the management program 140 issues an indication to the virtualization switch 60e to provide the migration-destination virtual volume 206e to the server 70 running the volume manager 78d. Then, for example, the management program 140 issues an indication to the volume manager 78d to change the data storage area of the logical volume 204d using a method that involves a data copy from the migration-source virtual volume 206d to the migration-destination virtual volume 206e. Finally, for example, the management program 140, as needed, issues an indication to the virtualization switch 60d to delete the migration-source virtual volume 206d, and thereafter issues an indication to the storage device 40d to delete the LU 208d.

The procedure described hereinabove is premised on the fact that there is a one-to-one relationship between the migration-source virtual volume 206d and the migration-source LU 208d. When the migration-source virtual volume 206d corresponds to a plurality of LU 208, the capacity of the migration-destination virtual volume 206e should be the same as that of the migration-source virtual volume 206d, but the number of LU 208 constituting the migration-destination virtual volume 206e can differ from that of the migration-source virtual volume 206d.

Further, the processing procedure described in this example can be applied in a case in which either a portion of the storage area of the logical volume 204d corresponds to the migration-source virtual volume 206d, or the entire storage area corresponds to the migration-source virtual volume 206d. Furthermore, when the logical volume 204d constitutes a plurality of virtual volumes 206, this process is independently implemented for all the respective virtual volumes 206 to be changed.

Now, a variety of processes carried out by this embodiment will be explained hereinbelow.

<<Information Gathering Process>>

The management program 140 holds configuration history information 142, backup data information 144, and free resource information 146. In this embodiment, the management program 140 can convert this information to its most recent state as described below.

First, for a storage configuration change, that is, when changing the configuration settings of a storage device 40, virtualization switch 60, and volume manager 78, and changing the settings of a DBMS 90, the management program 140 acquires from an administrator or the like a configuration setting change request, and after issuing an indication to the configuration setting target to change the configuration setting, stores the new setting in a relevant part inside configuration history information 142. When an indication is issued to the storage device 40 at this time to either create or delete a LU 208, information related to a free area on an HDD 16 inside the storage device 40 is simultaneously updated in the free resource information 146.

In the case of the addition or deletion of a DBMS 90 or server 70 as well, the management program 140 acquires from an administrator or the like a request for implementing these processes, and after executing this process, updates information related to a free server in the free resource information 146.

When acquiring or deleting a snapshot image of an LU 208 in a storage device 40, or when setting/releasing an update history acquisition in a LU 208, or deleting an acquired storage journal, the management program 140 acquires this indication from an administrator or the like, and, after issuing an indication to the storage device 40, updates the relevant part in the backup data information 144.

Further, when indicating a process to a DBMS 90 for making a log into an archive log, the management program 140 acquires this indication from an administrator or the like, and, after issuing the indication to the DBMS 90, updates the relevant part in the backup data information 144. Further, when the DBMS 90 autonomously makes a log into an archive log, the management program 140 acquires this indication from the DBMS 90, and updates the relevant part in the backup data information 144.

When implementing the DB recovery process described hereinbelow, if the setting of a storage configuration or DBMS 90, or server configuration of a DBMS 90 are changed (comprising addition and deletion), this change is reflected as well. Furthermore, a "server configuration" is a configuration related to a server, and, more specifically, for example, is the configuration (for example, a kind of OS or DBMS) in one server of a number of servers in a computer system.

In the method described hereinabove, an indication is sent to an indication target via the management program 140. A method that can be used instead of this method is one in which either the implementation of the above-mentioned processing in a storage device 40, virtualization switch 60, volume manager 78 and DBMS 90 is reported to the management program 140, or the management program 140 regularly confirms if these processes have been implemented, and when they have been implemented, updates the corresponding information. Furthermore, this process can also be implement for a volume manager 78 and DBMS 90 via the management agent 160.

<<DB Recovery Process>>

Figure 13:
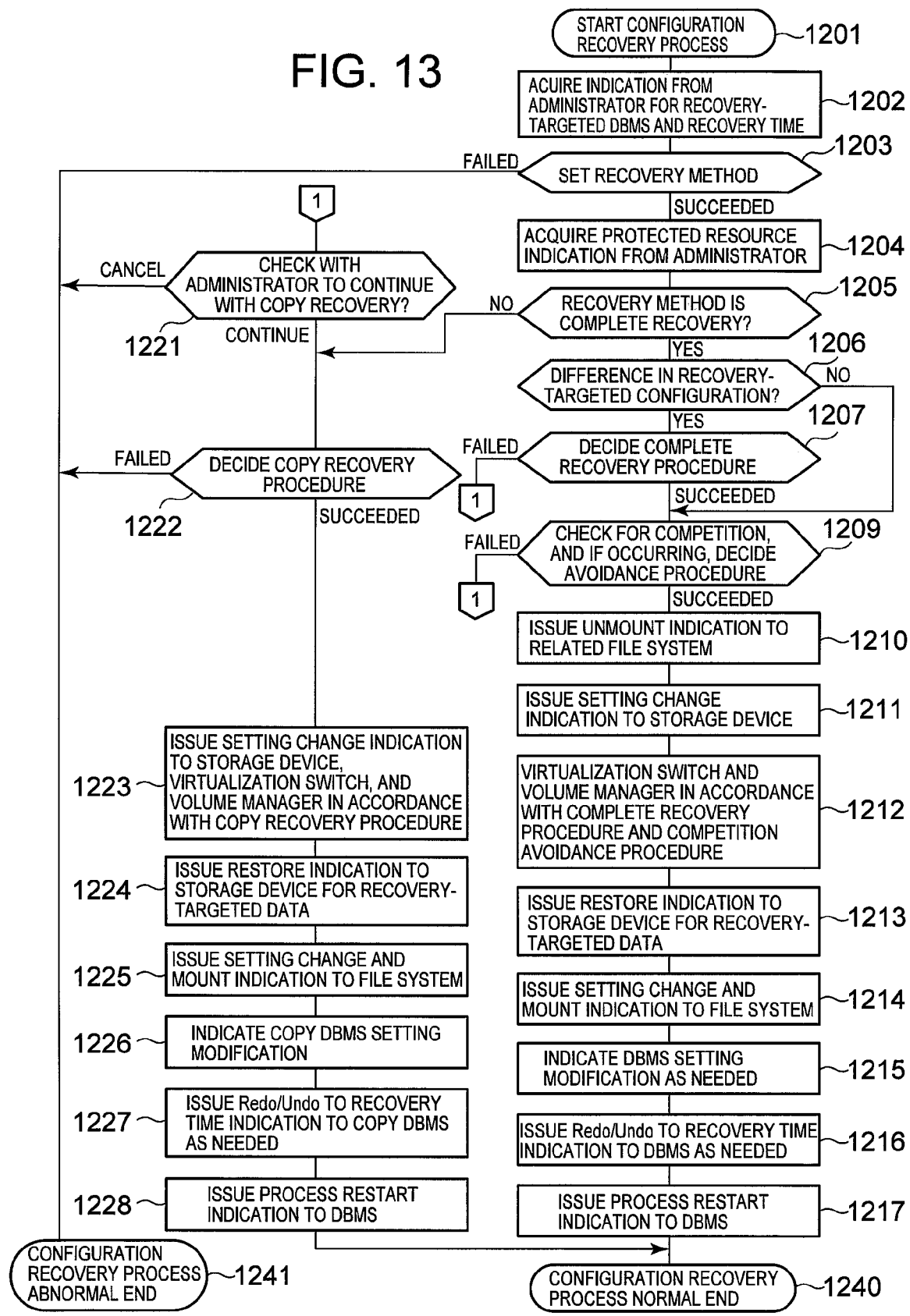
FIG. 13 is a diagram showing an example of the processing flow of the main process of a DB data recovery process.

FIG. 13 shows a flowchart of an example of the processing flow of the main process of a DB recovery process carried out by the management program 140.

The management program 140 commences this process upon receiving a start indication for a DB recovery process from an administrator. The explanation given here supposes that an administrator indicates the start of processing from the management terminal 110 (Step 1201).

The management program 140 acquires via the management terminal 110 from the administrator the identifier of the DBMS 90, which manages the DB data targeted for recovery, and the recovery time of the DB data. Furthermore, when the recovery-targeted DBMS 90 is a cluster configuration, a plurality of DBMS 90 running on a plurality of servers 70 correspond to the value of a single identifier (Step 1202).

The management program 140 executes a process for setting the recovery method, which will be explained using FIG. 14. When this process succeeds, processing proceeds to step 1204, and when this process fails, processing proceeds to step 1241 and this process ends abnormally (Step 1203).

The management program 140 receives a protected resource indication from the administrator. Here, protected resource is a part that is not subjected to a configuration change by this process, and specifies a DBMS 90, virtualization switch 60, storage device 40, I/O path 34, logical volume 204, virtual volume 206, LU 208, HDD 16 inside a storage device 40, partitioned cache 212, and so forth (Step 1204).

The management program 140 ascertains if the recovery method set in Step 1203 is a complete recovery. If it is "Yes", processing proceeds to Step 1206, and if it is "No", processing jumps to Step 1222 (Step 1205).

The management program 140 ascertains if a difference exists in the storage configurations of the current point in time and of the recovery time for the "recovery-targeted data" determined by the processing of Step 1203. This comparison is carried out by referencing the configuration history information 142. The current configuration can be determined as the latest configuration of each element. For the recovery time configuration, the management program 140 references the entry that holds the setting date/time 302, and the latest configuration under the conditions of prior to the recovery time become the configuration information of the recovery time. A logical volume 204, virtual volume 206, LU 208 and HDD 16 corresponding to the recovery-targeted data can be determined by referencing the correspondence information stored in the configuration history information 142 (information that expresses the corresponding relationships (storage area corresponding relationships) explained by referring to FIG. 2).

The value of the server ID 304 in the configuration history information 142 is the same for the DBMS setting information 400 and the OS setting information 440, and corresponds to the same date/time data in the above-described method. When the value of the file type 426 in the DBMS setting information 400 is "File", the management program 140 determines the mount status of the file system 80 from the mount point 458 in the OS setting information 440, and determines the corresponding relationship from the substantial file pathname 424. When the value of the file type 426 is "Raw", the management program 140 determines the corresponding relationship from this substantial file pathname 424 and the raw device pathname 460 in the OS setting information 440. Further, when the recovery-targeted data is a DBMS system directory, the management program 140 handles this by treating the file type 426 as holding the value "File", and the value of the system directory path 404 as being the value of the substantial file pathname 424.

When a difference exists in the storage configuration of the current point in time and the recovery time, processing proceeds to Step 1207, and when a difference does not exist, processing proceeds to Step 1208 (Step 1206).

The management program 140 implements a process for deciding a complete recovery procedure, which will be explained using to FIG. 16. When the complete recovery procedure decision succeeds, processing proceeds to Step 1209, and when it fails, processing jumps to Step 1221 (Step 1207).

The management program 140 implements a process for ascertaining if competition will occur, and if competition will occur, for setting a procedure to avoid this competition. This process will be explained using FIG. 18. When this process succeeds, processing proceeds to Step 1210, and when it fails, processing jumps to Step 1221 (Step 1209).

The management program 140 issues an indication to the DBMS 90, which is specified as the recovery target, to stop processing (Step 1210).

Referencing the configuration history information 142 using the same method as that of Step 1206, the management program 140 determines the file system that manages a file, of the files 202 corresponding to the recovery-targeted data, in which the value of the file type 426 is "File", and issues an indication to the file system 80 for the unmounting thereof (Step 1211).

The management program 140 indicates a setting change for the corresponding storage device 40, virtualization switch 60, and volume manager 78 in accordance with the complete recovery procedure and competition avoidance procedure created in Steps 1207 and 1209. The issuing sequence of the indications, for example, will conform to the sequence set as complete recovery procedure, and competition avoidance procedure (Step 1212).

The management program 140 issues an indication to the corresponding storage device 40 to restore data in accordance with a method, which is determined by a process (implemented in Step 1203), which will be explained using FIG. 15 (Step 1213).

The management program 140 issues an indication to the corresponding file system 80 to change a setting in accordance with the complete recovery procedure created in Step 1207. Thereafter, referencing the configuration history information 142 using the same method as that of Step 1206, the management program 140 determines the file system that manages a file, of the files 202 corresponding to the recovery-targeted data, in which the value of the file type 426 is "File", and issues an indication to the file system 80 for the mounting thereof. The management program 140 confirms the respective values of the data file pathname 422 and substantial file pathname 424 in the recovery time DBMS setting information 400 of the recovery-targeted DBMS 90. When these pathnames differ, the management program 140 issues an indication to the file system 80 to set the file entry shown in the data file pathname 422 as a symbolic link to the substantial file pathname 424 (Step 1214).

When it has decided on the implementation of a recovery process in which the recovery time and server configuration in Step 1207 differ, the management program 140 issues an indication to the management agent 160, which is being executed on the server 70 that is running the recovery-targeted DBMS 90, to modify the DBMS setting information and cluster configuration information, which were decided in Step 1405, and which are stored under a restored DBMS system directory. Further, if the creation, initialization and so forth of a log storage area are required, the management program 140 issues an indication to the management agent 160 for the execution thereof. Further, the management program 140 updates the free server ID 672 and free resource 674 in the free resource information 146 to coincide with the utilization state of the server 70 subsequent to recovery (Step 1215).

When it has decided to implement a DB recovery, which utilizes an archive log in the process, which will be explained using FIG. 15, the management program 140 issues an indication to the DBMS 90 to implement a Redo/Undo process utilizing an archive log. An environment variable, which is used when restarting processing subsequent to a recovery is set at this time. When the DBMS 90 is a cluster configuration, a Redo/Undo process can be implemented using a log that was created and converted to an archive log by a DBMS 90 executed by a different server 70. Further, if necessary, a request can be acquired from the DBMS 90 that is undergoing Redo/Undo processing, and a DBMS 90 server configuration change, and storage configuration change can be implemented while a Redo/Undo process is in progress.

The storage destination of an archive log can be determined from backup data information 144. When an access path to the archive log that the target DBMS 90 will use in a recovery process has not been set at this time, the management program 140 sets this access path. That is, the management program 140 issues an indication to the storage device 40 to provide the archive log to the virtualization switch 60 of the LU 208 in which this log is stored. Further, the management program 140 issues an indication to the virtualization switch 60 to create a virtual volume 206 that has the LU 208 in which the archive log is stored as a component, and to provide same to the server 70 on which the target DBMS 90 is running. Further, the management program 140 issues an indication to the volume manager 78 to create a logical volume 204, which has the created virtual volume 206 as a component. Further, when the archive log is stored as a file, the management program 140 issues an indication to the file system 80 to mount the created logical volume in a suitable location. Subsequent to Redo/Undo processing by the DBMS 90 ending, the processing indicated in this step is reversed, that is, the management program 140 issues respective indications to the file system 80 to unmount the logical volume 204 that was mounted, to the volume manager 78 to delete the logical volume it created, to the virtualization switch 60 to delete the virtual volume 206 it created, and to the storage device 40 to change the provision of settings to not provided (Step 1216).

The management program 140 issues an indication to the target DBMS 90 to restart processing. An environment variable, which is stored in the recovery time DBMS setting information 400, is set at this time. When the DBMS 90 is a cluster configuration, and the server configuration thereof is changed, the management program 140 restarts the DBMS 90 with the post-change server configuration. Processing then proceeds to Step 1240 (Step 1217).

The management program 140 ends this process normally (Step 1240).

The management program 140 creates a copy of the recovery-targeted data at recovery time, and checks with the administrator to determine if DB recovery processing will continue using a method for constructing a system capable of accessing this data. This confirmation process is implemented via the management terminal 110 using a notification screen. When the administrator responds that processing will continue, processing proceeds to Step 1222, and when the administrator responds that processing is canceled, processing proceeds to Step 1241 and this process ends abnormally (Step 1221).

The management program 140 implements a process that decides a copy recovery procedure, which will be explained using FIG. 18. When the recovery procedure decision succeeds, processing proceeds to Step 1223, and when it fails, processing proceeds to Step 1241, and this process ends abnormally (Step 1222).

The management program 140 issues indications to the corresponding storage device 40, virtualization switch 60 and volume manager 78 to change settings in accordance with the copy recovery procedure created in Step 1222. The indication issuing sequence conforms to a sequence that is set as copy recovery procedure (Step 1223).

The management program 140 issues an indication to the corresponding storage device 40 to restore data in accordance with the method decided by the process (implemented in Step 1203), which will be explained using FIG. 15. Furthermore, data restoration is carried out to an LU 208 newly allocated for use in copy recovery processing (Step 1224).

The management program 140 issues an indication to the corresponding file system 80 to change a setting in accordance with the copy recovery procedure created in Step 1222. Thereafter, referencing the configuration history information 142 using the same method as that of Step 1206, the management program 140 determines the file system that manages a file, of the files 202 corresponding to the recovery-targeted data, in which the value of the file type 426 is "File", and issues an indication to the file system 80 for the mounting thereof.

In addition, when, in accordance with a change of the data file pathname 422 and substantial file pathname 424 decided in Step 1612, there is a mismatch therebetween, the management program 140 issues an indication to the file system 80 to set the file entry shown in the post-change data file pathname 422 as a symbolic link to the post-change substantial file pathname 424. Furthermore, when a portion of an object 222 is specified by recovery-targeted data, a symbolic link confirmation and setting process is carried out only for the part corresponding to the recovery-targeted data (Step 1225).

The management program 140 issues an indication to modify the setting information stored under the DBMS system directory of the DBMS 90 (hereinafter "copy DBMS") that manages the recovery-targeted data, which has been copied (hereinafter, "copied recovery data") to the management agent 160 being executed by the server 70 on which these are running. The content to be modified is decided in Step 1612. DBMS setting information 400 for the copy DBMS is created at the same time based on a copy of the recovery time DBMS setting information 400 of the recovery-targeted DBMS 90, which was copied, and is stored in the configuration history information 142. Furthermore, the contents of the DBMS setting information 400 are also modified to coincide with the setting information stored under the DBMS system directory. Further, if the creation, initialization and so forth of the log storage area (file 202 and the like) are necessary to match up with the server configuration of the copy DBMS, the management program 140 issues an indication to the management agent 160 for the execution thereof.

Furthermore, the free server ID 672 and free resource 674 in the free resource information 146 is updated to coincide with the utilization status of the server 70 by virtue of the copy DBMS (Step 1226).

When it has decided to implement a DB recovery that uses an archive log in a process, which will be explained using FIG. 15, the management program 140 issues an indication to the copy DBMS to implement a Redo/Undo process that uses an archive log. The details of this step are the same as those of Step 1216, with the exception that the one implementing the Redo/Undo process changes from the recovery-targeted DBMS 90 to the copy DBMS (Step 1227).

The management program 140 issues an indication to the copy DBMS to commence the processing. An environment variable, which is held by the DBMS setting information 400 for the copy DBMS, is set at this time. Then, processing proceeds to Step 1240 (Step 1228).

Figure 14:
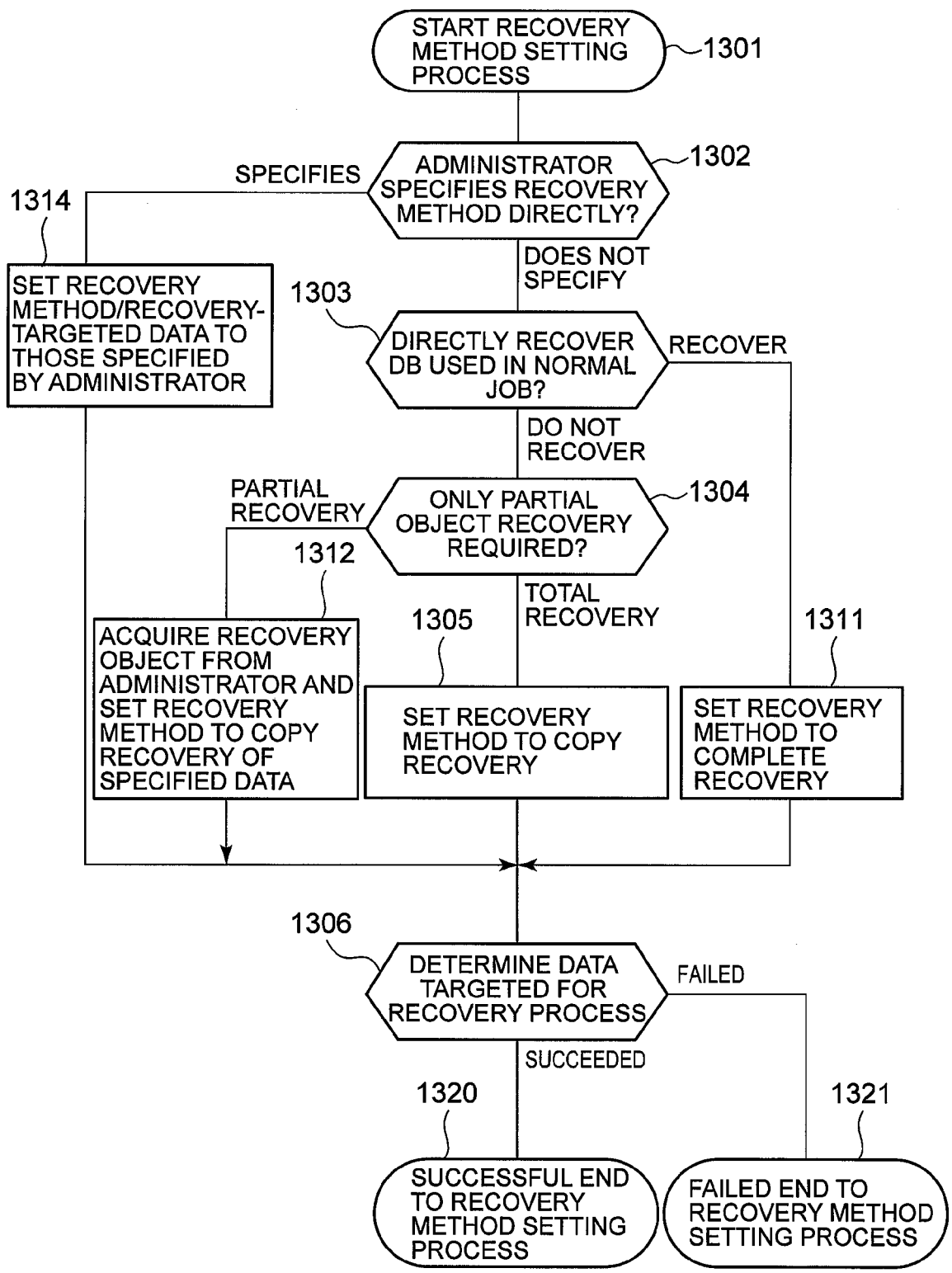
FIG. 14 is a diagram showing an example of the processing flow of a DB data recovery method setting process.

FIG. 14 shows a flowchart of an example of a processing flow of a process, which is implemented by the management program 140 as Step 1203, and which sets the DB data recovery method. Processing commences at Step 1301.

The management program 140 checks with the administrator via the management terminal 110 to determine if the administrator directly sets the recovery method. If the recovery method is directly set, processing jumps to Step 1314, and if it is not directly set, processing proceeds to Step 1303 (Step 1302).

The management program 140 checks with the administrator via the management terminal 110 to determine if the recovered DB data is directly used in a job. When it is to be put to direct use, processing jumps to Step 1311, and when it will not be used, processing proceeds to Step 1304. Furthermore, a method for making direct use of recovered data is specifically selected in the case of a configuration recovery resulting from a performance issue, process re-execution-based recovery from the widespread affects of error handling or a server 70 virus infection, and so forth. This kind of guidance can be presented to the administrator via the management terminal 110 (Step 1303).

The management program 140 checks with the administrator via the management terminal 110 to determine if only a portion of an object 222 is to be recovered. If only a portion of an object 222 is to be recovered, processing jumps to Step 1312, and if all data is to be recovered, processing proceeds to Step 1305. Specifically, recovery of only a portion of tabular data is selected when extracting old data in the recovery of erroneously deleted tabular data, and the like. This kind of guidance can be presented to the administrator via the management terminal 110 (Step 1304).

The management program 140 sets the DB data recovery method to copy recovery, and advances processing to Step 1306 (Step 1305).

The management program 140 implements a process for determining the data to be processed in a recovery process. This process will be explained using FIG. 15. When determination of the data succeeds, processing jumps to Step 1320, and this process ends normally. When data determination fails, processing jumps to Step 1321, and this process ends abnormally (Step 1306).

The management program 140 sets the DB data recovery method to complete recovery, and advances processing to Step 1306 (Step 1311).

The management program 140 acquires from the administrator via the management terminal 110 identification information of an object 222 (object name 414) required for recovery. Thereafter, the management program 140 sets the DB data recovery method to copy recovery of an object 222 determined by the acquired object name 414, and advances processing to Step 1306 (Step 1312).

The management program 140 acquires from the administrator via the management terminal 110 the recovery method, and, when the recovery method is a copy method of a portion of the data (object 222), identification information (object name 414) of the object 222 targeted in this recovery. The management program 140 sets the acquired information as the recovery method, and advances processing to Step 1306 (Step 1314).

Figure 15:
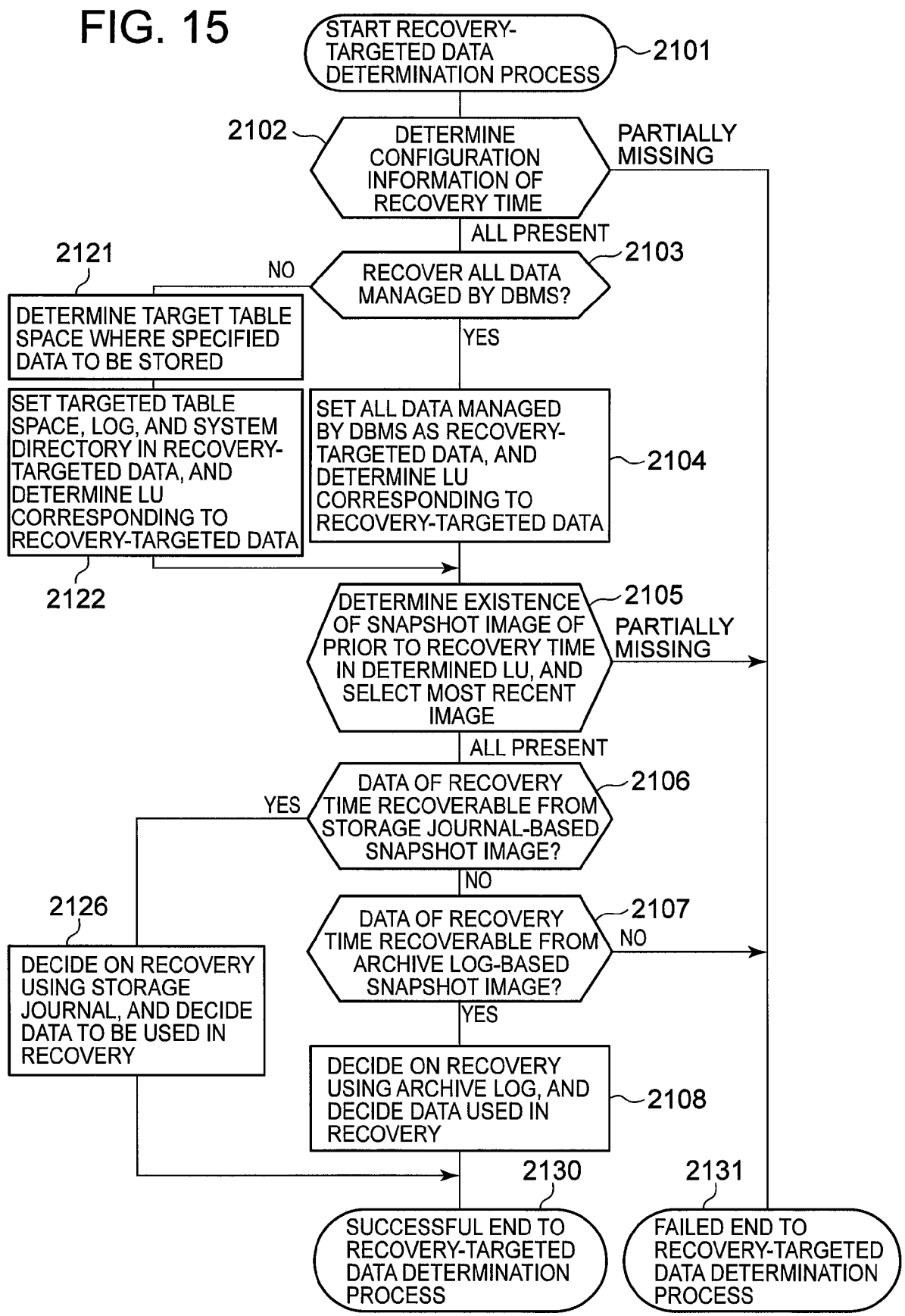
FIG. 15 is a diagram showing an example of the processing flow of a recovery-targeted data determination process.

FIG. 15 shows a flowchart of an example of a processing flow of a recovery-targeted data determination process, which is implemented as Step 1306 by the management program 140. Processing commences at Step 2101.

Referencing the configuration history information 142 using the same method as that of Step 1206, the management program 140 ascertains if configuration information exists at the recovery time corresponding to the recovery-targeted DBMS 90. At this time, the management program 140 not only ascertains if corresponding configuration information exists in the table space, but also in the data inside a DBMS system directory. If all configuration information exists, processing advances to Step 2103, but if even a portion of this configuration information does not exist, processing jumps to Step 2131, and this process ends abnormally (Step 2102).

The management program 140 ascertains if all of the data managed by the recovery-targeted DBMS 90 is to be recovered. In the processing flow of FIG. 14, if Step 1312 is executed, or if Step 1314 is executed, and copy recovery of a portion of the data (object 222) is specified by the administrator, all data is not recovered, and processing proceeds to Step 2121. In all other cases, processing proceeds to Step 2104 (Step 2103).

The management program 140 sets all the data managed by the recovery-targeted DBMS 90 at the recovery time (including the data inside the system directory) as the recovery-targeted data, and determines the LU 208 corresponding to the recovery-targeted data by referencing the configuration history information 142 using the same method as that of Step 1206 (Step 2104).

The management program 140 references the backup data information 144 to determine if a snapshot image of prior to the recovery time exists for the determined LU 208. When a plurality of such snapshot images exist for a certain LU 208, the management program 140 selects the most recent thereamong. When all the snapshot images for all the determined LU 208 exist, processing proceeds to Step 2106, but if even a portion of these snapshot images do not exist, processing jumps to Step 2131 and this process ends abnormally (Step 2105).

The management program 140 determines if storage journal-based recovery up to the recovery time is possible from the snapshot images selected in Step 2105, that is, it determines whether or not storage journals exist for all the selected snapshot images from the point in time at which these snapshot images were acquired until the recovery time. When all the storage journals exist, recovery is deemed possible and processing proceeds to Step 2126. If a portion of the storage journals do not exist, recovery is deemed impossible and processing proceeds to Step 2107 (Step 2106).

The management program 140 determines if archive log-based recovery up to the recovery time is possible from the snapshot images selected in Step 2105, that is, it determines if snapshot images all acquired simultaneously exist for all of the determined LU 208, and if an archive log from the time of acquisition of this snapshot image until the recovery time exists. This determination is implemented by referencing the backup data information 144. When the snapshot images and archive log exist, recovery is deemed possible and processing proceeds to Step 2108, and when they do not exist, recovery is deemed impossible, processing proceeds to Step 2131, and this process ends abnormally. Furthermore, "snapshot images all acquired simultaneously exist" refers to the fact that there are snapshot images, which were all acquired simultaneously for all of the determined LU 208 prior to the recovery time (For example, there are snapshot images of the LU group to which all of the determined LU 208 belong.).

Furthermore, when the recovery-targeted DBMS 90 can carry out recovery for each table space, the condition can be alleviated by the following process. The management program 140 determines the table space setting of the recovery time in accordance with the recovery-targeted DBMS 90 recovery time DBMS setting information 400 in the configuration history information 142. Based on this, the management program 140 references the configuration history information 142 and determines the corresponding relationships up to the LU 208 of each table space at recovery time, and creates a group of LU 208 corresponding to the same table space (one LU 208 can be an element in a plurality of groups). Snapshot images are simultaneously acquired for the component LU 208 in the respective groups, and when an archive log exists from the snapshot image acquisition time to the recovery time, a determination is made that recovery is possible (Step 2107).

The management program 140 decides to carry out a recovery process using an archive log, and decides that the snapshot images and archive log determined up until Step 2107 will be the data used in the recovery process. Then, the management program 140 advances processing to Step 2130 (Step 2108).

The management program 140 ends this process normally (Step 2130).

The management program 140 references the configuration history information 142 using the same method as in Step 1206, and determines the table space in which the recovery-targeted data (object 222) is stored at the recovery time (Step 2121).

The management program 140 sets the data inside the recovery-targeted table space determined in Step 2121, the log of the recovery-targeted DBMS 90, and the system directory as the recovery-targeted data, references the configuration history information 142 using the same method as in Step 1206, and determines the LU 208 corresponding to the recovery-targeted data. Then, the management program 140 advances processing to Step 2105 (Step 2122).

The management program 140 decides to carry out a recovery process using storage journals, and decides that the snapshot images and storage journals determined up until Step 2106 will be the data used in the recovery process. Then, the management program 140 advances processing to Step 2130 (Step 2126).

Figure 16:
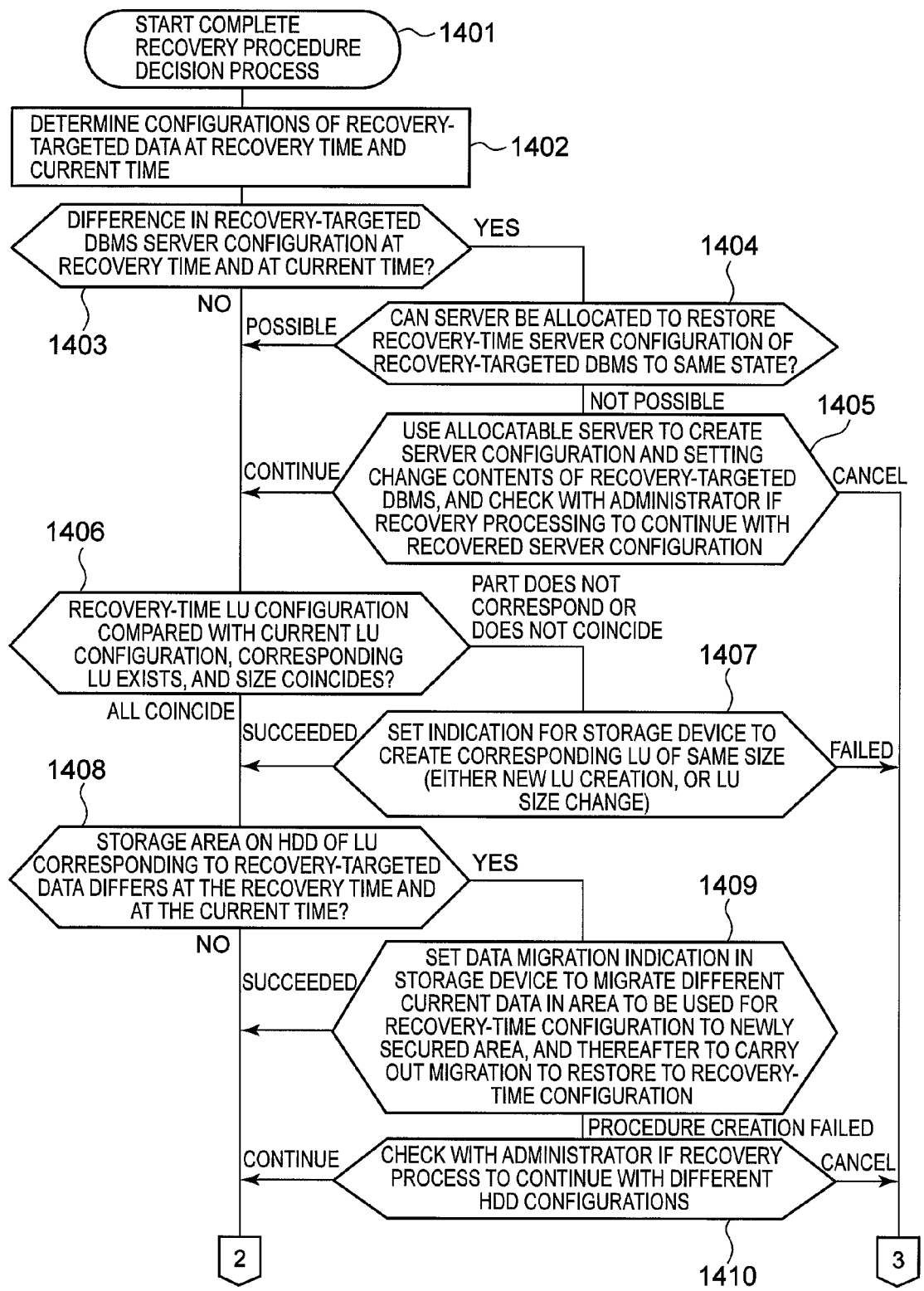
FIG. 16 is a diagram showing one part of an example of the processing flow of a process for determining a complete recovery procedure.
Figure 17:
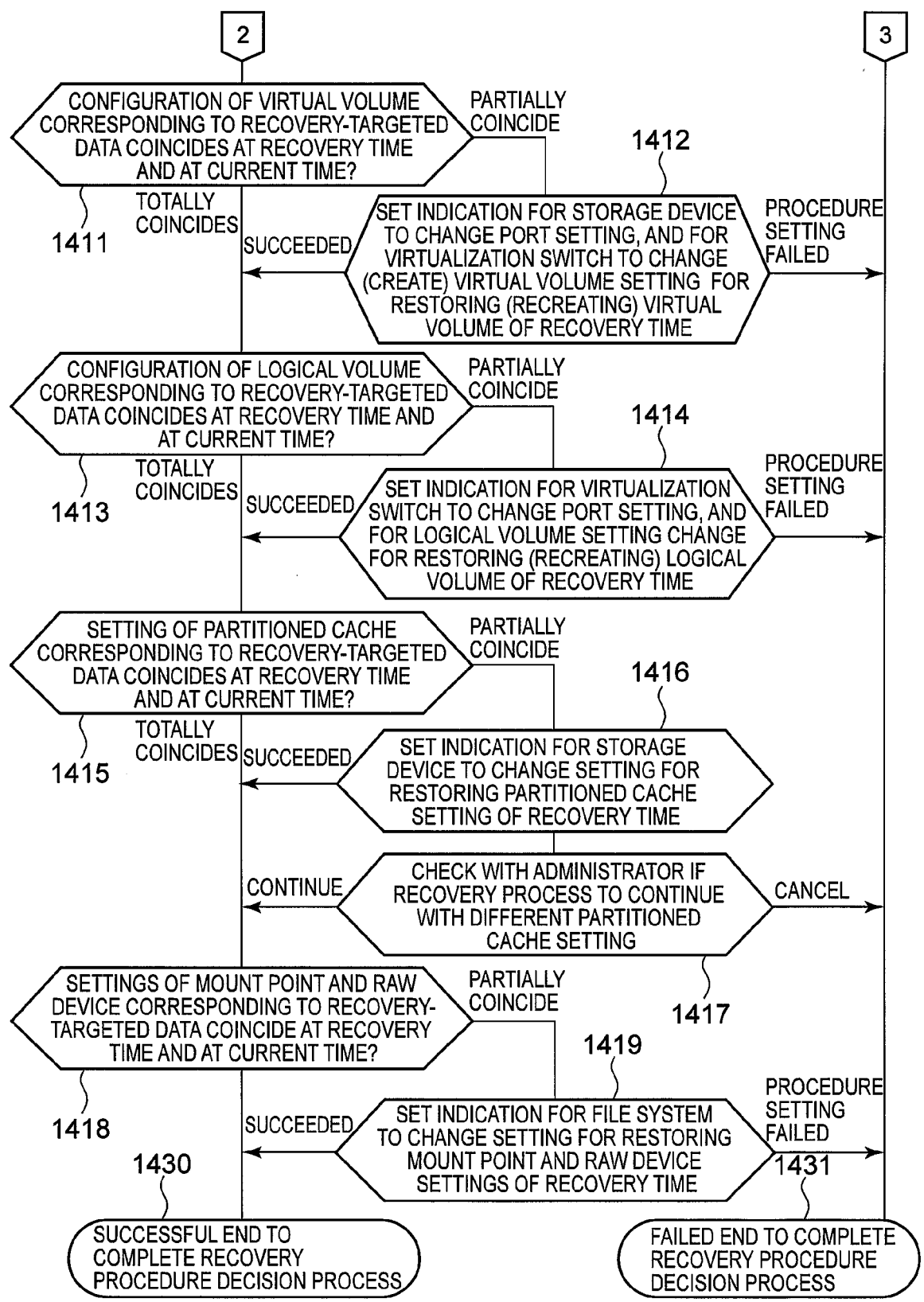
FIG. 17 is a diagram showing the remaining part of an example of the processing flow of a process for determining a complete recovery procedure.

FIGS. 16 and 17 show flowcharts of an example of a processing flow of a process for deciding a complete recovery procedure, which is implemented as Step 1207 by the management program 140. With the exception of the indication for the file system 80, the procedure set before the procedure set in this process is executed in advance in Step 1212. Processing commences at Step 1401.

The management program 140 references the configuration history information 142 using the same method as in Step 1206, and determines the server configuration of the recovery-targeted DBMS at the recovery time and at the current time, and the storage configuration from the file 202 (to include a situation in which the raw device mechanism is used) corresponding to the recovery-targeted data in the respective component DBMS 90 up to the HDD 16 inside the storage device 40. This information is called "configuration work information". Furthermore, when a procedure, which issues a configuration change indication in the following step for the configuration of the current point in time inside the configuration work information, has been set, the management program 140 stores the configuration subsequent to implementing this procedure. That is, the management program 140 changes this information each time it executes a step (Step 1402).

The management program 140 compares the server configuration of the recovery-targeted DBMS at the recovery time and at the current time by referencing the configuration work information. When no difference exists, processing proceeds to Step 1406, and when a difference does exist, processing proceeds to Step 1404 (Step 1403).

The management program 140 determines the server configurations of the recovery-targeted DBMS at the recovery time and at the current time from the configuration work information, and ascertains if it is possible to allocate a server for restoring these server configurations to the same state. When a DBMS 90 is running on a server 70 other than the current component, the management program 140 ascertains if it is possible to execute the DBMS 90 on this server 70 (a server 70, which is a server that is not a component of the current DBMS 90, and which is used as a standby system) by referencing the free resource information 146 (For example, it references the free resource information 146 to ascertain whether or not it is possible to additionally execute the DBMS 90 even though another program is currently being executed on this server 70.). When this is possible, the management program 140 advances processing to Step 1406 to implement recovery processing with the server configuration of the recovery time, and when this is not possible, processing proceeds to Step 1405. Furthermore, when the number of server configurations at the current time is greater than at the recovery time, the management program 140 can make the determination to advance to Step 1405 to implement recovery processing using a current server configuration (Step 1404).

The management program 140 determines the server configuration of the recovery-targeted DBMS at the current time from the configuration work information, and creates a server configuration at the recovery of the recovery-targeted DBMS from this server configuration and a new allocatable server 70. The management program 140 uses the notification screen to check with the administrator via the management terminal 110 to determine if recovery processing will continue using this server configuration.

When the recovery-targeted DBMS is not a cluster configuration, the recovery-targeted data can be accessed as-is even if the server is different. In the case of a shared disk-type cluster configuration, the recovery-targeted data is accessible as-is (the DBMS running on the respective servers 70 reference all the recovery-targeted data), but the cluster configuration information must be modified, and the management program 140 decides this modification method.

In the case of a shared nothing-type cluster configuration, data, which was being accessed by a DBMS 90 that was running on a server 70 that is currently not usable (may be called "data A" at this stage), must be allocated to a DBMS 90 being executed on another server 70. The management program 140 determines data A from the configuration work information, creates a plan (more specifically, digital data describing a plan) for reallocating this data using the indices of data quantity, access path settable/unsettable (for example, whether or not access is possible based on the physical configuration of the access path) and so forth, and presents these to the administrator. More specifically, for example, the configuration work information comprises information indicating a storage configuration from recovery-targeted DBMS server configuration at the recovery time and at the current time, and the respective component DBMS 90 to a file 202. That is, the management program 140 determines the differences of the component DBMS 90 at the current time and at the recovery time, and determines from among the DBMS 90 that do not coincide at the recovery time and the current time, the DBMS 90 that was running at the recovery time. The data that was accessed by this DBMS 90 is determined as data A. Further, the above-mentioned allocation (reallocation), for example, refers to allocating (reallocating) data to a server 70 used as a standby system, or a DBMS 90 so as to manage (access) the data (a direct path change can be implemented afterwards). Further, the management program 140 also simultaneously implements the creation of a plan for reallocating data to a DBMS 90 that is not running at the recovery time. When a reallocation plan cannot be created, the management program 140 decides to cancel the recovery process. Furthermore, the reallocation of data requires that information related to the mapping of data inside the DBMS setting information, and cluster configuration information be modified, and the management program 140 decides this modification method.

When the recovery-targeted DBMS is a cluster configuration, and recovery processing is carried out with a larger number of servers than the number of servers at the recovery time, there will be servers 70 (DBMS 90) with no corresponding log data at the recovery time. For these servers 70, the management program 140 implements the creation and initialization of a log storage area (file 202, and so forth). Further, when a corresponding DBMS 90 does not exist at recovery time, the management program 140 decides on a method for creating DBMS setting information and an environment variable by modifying individual information from a copy of the setting information of a component of another cluster configuration.

When the administrator responds that processing will continue, the management program 140 substitutes the configuration created in this step for the configuration at the recovery time, and proceeds to Step 1406. When the administrator responds that processing will be cancelled, processing proceeds to Step 1431 and this process ends abnormally (Step 1405).

The management program 140 compares the LU 208 configuration at the recovery time and at the current time by referencing the configuration work information, and checks to determine if all corresponding LU 208 exist, and if the sizes thereof coincide with one another. When all the LU 208 exist and their sizes coincide, processing proceeds to Step 1408, and when a portion of the LU 208 do not exist or are of different sizes, processing proceeds to Step 1407 (Step 1406).

The management program 140 references the configuration work information, and when an LU 208 corresponding to the LU 208 of the recovery time does not exist at the current time, it issues an indication to the corresponding storage device 40 to create a new LU 208 of the same size as this, and when the size of the LU 208 of the recovery time and the current time differ, the management program 140 sets in the recovery processing procedure an indication for the corresponding storage device 40 to restore the size of this LU 208 to that of the recovery time (for example, digital data in which is recorded the sequence and destinations to which a plurality of indications are to be issued). At this point, the management program 140 references the free resource information 146 to ascertain if it is possible to establish the area in an HDD 16 necessary to issue these indications, and if there is insufficient space, processing fails. Further, processing also fails when the storage device 40, HDD 16, and LU 208 are specified as protected resources, making it impossible to carry out the above-mentioned processing. When processing succeeds, the management program 140 advances to Step 1408, and when processing fails, it advances to Step 1431 and this process ends abnormally (Step 1407)

The management program 140 references the configuration work information, and ascertains if the storage area on the HDD 16 in which the LU 208 corresponding to the recovery-targeted data is stored differs at the recovery time and at the current time. When differences exist, processing proceeds to Step 1409, and when there are no differences, processing proceeds to Step 1411 (Step 1408).

The management program 140 references the configuration work information regarding the differences in the LU 208 storage area on the HDD 16, and, when different LU 208 data currently exists in the area used by the recovery time configuration, additionally sets in the recovery processing procedure an indication for the corresponding storage device 40 to migrate this data to the newly established area as illustrated in FIG. 10, and an indication to perform a migration thereafter to restore this data to the recovery time arrangement. At this point, the management program 140 references the free resource information 146 to ascertain if it is possible to establish the area in an HDD 16 necessary to issue these indications, and if there is insufficient space, processing fails. Further, processing also fails when the storage device 40, HDD 16, and LU 208 are specified as protected resources, making it impossible to carry out the above-mentioned processing. Additionally, processing also fails when the HDD 16 utilized at the recovery time does not exist at the current time. When processing succeeds, the management program 140 advances to Step 1411, and when processing fails, it advances to Step 1410 (Step 1409).

The management program 140 uses the notification screen via the management terminal 110, and checks with the administrator to determine if recovery processing will continue with an HDD configuration that differs from that of the recovery time. When the administrator responds that processing will continue, processing proceeds to Step 1411, and when the administrator responds that processing will be cancelled, processing proceeds to Step 1431 and this process ends abnormally (Step 1410).

The management program 140 references the configuration work information, and ascertains if the configurations of the virtual volume 206 corresponding to the recovery-targeted data coincide with one another at the recovery time and at the current time. When everything coincides, processing proceeds to Step 1413, and when a part does not coincide, processing proceeds to Step 1412 (Step 1411).

When the configurations of the virtual volume 206 do not coincide at the recovery time and at the current time, the management program 140 additionally sets in the recovery processing procedure a procedure for restoring the virtual volume 206 of the recovery time. First, the management program 140 references the configuration work information, and when the virtualization switch 60, which provides the restoration-targeted virtual volume 206, cannot access the LU 208 that is a component thereof, it additionally sets in the recovery processing procedures an indication to the storage device 40, which possesses this LU 208, to set the corresponding relationship of the LU 208 and the port 36 so as to provide this LU 208 to the virtualization switch 60 targeted by the restoration. When a virtual volume 206 is constituted from a plurality of LU 208, the management program 140 additionally sets indications in the recovery processing procedure for each thereof. Further, the management program 140, as necessary, additionally sets in the recovery processing procedure an indication for the virtualization switch 60 to recognize the LU 208. Thereafter, the management program 140 additionally sets in the recovery processing procedure an indication to restore (recreate) the virtual volume 206 in the virtualization switch 60 targeted by the restoration.

Processing fails when the storage device 40, I/O path 34, virtualization switch 60, and virtual volume 206 are specified as protected resources, thus making it impossible to carry out the above-mentioned processing. When processing succeeds, the management program 140 advances to Step 1413, and when processing fails, it advances to Step 1431, and this process ends abnormally (Step 1412).

The management program 140 references the configuration work information, and ascertains if the configurations of the logical volume 204 corresponding to the recovery-targeted data coincide with one another at the recovery time and at the current time. When everything coincides, processing proceeds to Step 1415, and when a part does not coincide, processing proceeds to Step 1414 (Step 1413).

When the configurations of the logical volume 204 do not match at the recovery time and at the current time, the management program 140 additionally sets in the recovery processing procedure a procedure for restoring the logical volume 204 of the recovery time. The management program 140 references the configuration work information, and when the volume manager 78, which provides the restoration-targeted logical volume 204, cannot access the virtual volume 206 that is a component thereof, it additionally sets in the recovery processing procedure an indication to the virtualization switch 60, which provides this virtual volume 206, to set the corresponding relationship of the virtual volume 206 and the port 36 so as to provide this virtual volume 206 to the server 70 on which the volume manager 78 targeted by the restoration is running. When the logical volume 204 is constituted from a plurality of virtual volumes 206, the management program 140 additionally sets indications in the recovery processing procedure for each thereof. Further, the management program 140, as necessary, additionally sets in the recovery processing procedure an indication for the volume manager 78 to recognize the virtual volume 206. Thereafter, the management program 140 additionally sets in the recovery processing procedure an indication to restore (recreate) the logical volume 204 in the volume manager 78 targeted by the restoration.

Processing fails when the I/O path 34, virtualization switch 60, volume manager 78, and logical volume 204 are specified as protected resources, thus making it impossible to carry out the above-mentioned processing. When processing succeeds, the management program 140 advances to Step 1415, and when processing fails, it advances to Step 1431, and this process ends abnormally (Step 1414).

The management program 140 references the configuration history information 142 using the same method as in Step 1206, and determines the partitioned cache 212 of the LU 208 corresponding to the recovery-targeted data at the recovery time and at the current time. The management program 140 ascertains if the configurations of the determined partitioned cache 212 at the recovery time and at the current time, that is, if the component LU 208 and cache memory capacities coincide by referencing the respectively corresponding storage device setting information 550. When everything coincides, processing proceeds to Step 1418, and when a part does not coincide, processing proceeds to Step 1416 (Step 1415).

The management program 140 sets a procedure for restoring the partitioned cache setting. The management program 140 references the configuration history information 142 using the same method as in Step 1206, and for configurations in which the components of the partitioned cache 212 that do not coincide with one another, additionally sets in the recovery processing procedure an indication to the corresponding storage device 40 to add or delete the LU 208, which belongs to the partitioned cache 212 for restoring the components of the recovery time. Further, for configurations in which the cache memory capacities of the partitioned cache memories 212 do not coincide, the management program 140 additionally sets in the recovery processing procedure an indication to the corresponding storage device 40 to augment or reduce the cache memory capacity to restore the cache memory capacity to that of the recovery time.

When cache memory capacity is augmented, cache memory is secured from the default partitioned cache, and when this capacity is reduced, cache memory is returned to the default cache memory. The management program 140 references the latest corresponding values in the storage device setting information 550 in the configuration history information 142 to determined whether or not the required capacity of cache memory can be secured from the default cache memory, and when the cache memory capacity of the post-change default cache memory is not below a predetermined minimum required capacity, it determines the capacity to be securable. When the determination is that the capacity is not securable, processing fails. Further, processing also fails when the storage device 40 and partitioned cache 212 are specified as protected resources, making it impossible to carry out the above-mentioned processing. When processing succeeds, the management program 140 advances to Step 1418, and when processing fails, it advances to Step 1417 (Step 1416).

The management program 140 uses the notification screen by way of the management terminal 110 to check with the administrator to determine if recovery processing will continue with a partitioned cache configuration that is different than that of the recovery time. When the administrator responds that processing will continue, the management program 140 advances to Step 1418, and when the administrator responds that processing will be cancelled, it advances to Step 1431 and this process ends abnormally (Step 1417).

The management program 140 references the configuration work information and makes the following confirmation. First, the management program 140 determines the logical volume 204 and the partition thereof in which the recovery-targeted data of the recovery time is stored. With regard to the determined logical volume 204 and partition, when the file 202 that stores the recovery-targeted data is a normal file, the management program 140 ascertains if the values of the mount points 458 at the recovery time and at the current time coincide with one another, and when a raw device mechanism is used, ascertains if the values of the raw device pathnames 460 coincide with one another at the recovery time and at the current time. When everything coincides, processing proceeds to Step 1430, and when a part does not coincide, processing proceeds to Step 1419 (Step 1418).

The management program 140 additionally sets in the recovery processing procedure a procedure for restoring the mount point and raw device settings. First, for a configuration in which the values of the mount point 458 do not coincide at the recovery time and at the current time, the management program 140 additionally sets in the recovery processing procedure an indication for the corresponding file system 80 to restore (change) the mount point to that of the recovery time. Next, for a configuration in which the values of the raw device pathname 460 do not coincide at the recovery time and at the current time, the management program 140 additionally sets in the recovery processing procedure an indication for the corresponding file system 80 to restore (change) the raw device setting to that of the recovery time.

Processing fails here when the file system is specified as a protected resource, making it impossible to carry out the above-mentioned processing. When processing succeeds, the management program 140 advances to Step 1430, and when processing fails, it advances to Step 1431 and this process ends abnormally (Step 1419).

The management program 140 ends this process normally (Step 1430).

Figure 18:
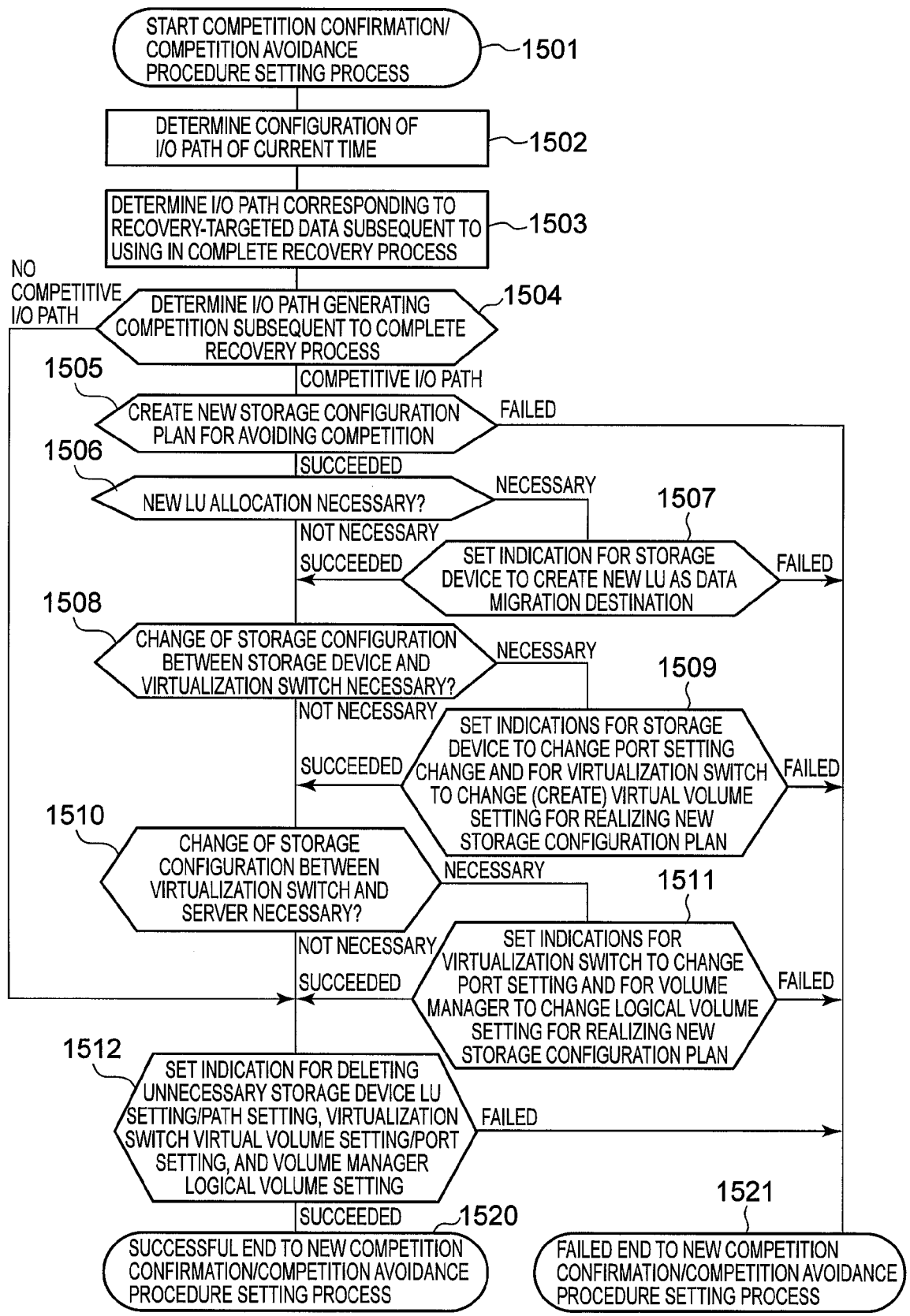
FIG. 18 is a diagram showing an example of the processing flow of a process for setting a competition avoidance procedure.

FIG. 18 shows a flowchart of one example of a processing flow of a process, which is implemented as Step 1209 by the management program 140, and which sets a procedure (competition avoidance procedure) for confirming if competition occurs, and when competition occurs, for avoiding same. The procedure set by this process is executed in Step 1212 in sequence from the procedure set beforehand by this process, subsequent to the complete recovery procedure having ended. Processing commences from Step 1501.

The management program 140 determines the configuration of an I/O path 34 at the current time from the configuration history information 142. This information is called "I/O path configuration work information". The configuration of the I/O path 34 is determined by referencing receiving port/sending port settings comprising the latest OS setting information 440, switch setting information 500 and storage device setting information 550 corresponding to the respective elements in the configuration history information 142. Furthermore, after setting a procedure for issuing a configuration change indication related to the configuration of the current time in the I/O path configuration work information, the management program 140 stores the configuration after this procedure has been implemented. That is, this information changes each time a step is executed (Step 1502).

The management program 140 determines the storage configuration from the logical volume 204 corresponding to the recovery-targeted data to the LU 208 after a complete recovery procedure has been applied. More specifically, referencing the configuration history information 142 using the same method as that of Step 1206, the management program 140 determines the storage configuration corresponding to the recovery-targeted data of the current time, and thereafter reflects the part of the configuration changed by the complete recovery procedure in the determined configuration. The management program 140 determines the I/O path 34 being used in I/O processing of the recovery-targeted data from the determined storage configuration, and marks "Recovery Time Use" in the I/O path configuration work information (Step 1503).

The management program 140, subsequent to complete recovery processing of the storage configuration corresponding to the recovery-targeted data, determines an I/O path 34 on which competition occurs. First, the management program 140 focuses on the I/O path 34 marked "Recovery Time Use" in the I/O path configuration work information, and determines the device (server 70, virtualization switch 60) by which the receiving port setting thereof is being carried out, and the port 36. In the configuration history information 142, the management program 140 references the information of the recovery time and the current time (latest) in either the OS setting information 440 or the switch setting information 500 corresponding to the determined device, and determines the virtual structure (here, either the virtual volume 206 or LU 208), which is referenced by way of the determined port 36 at both the recovery time and the current time. When there is a virtual structure, which is referenced at the current time but not referenced at the recovery time, competition will occur on this I/O path 34. The management program 140 marks "Competition" in the I/O path configuration work information for the I/O path 34 on which competition occurs, and stores all the identifiers of the virtual structures that are the cause of the competition. When there is an I/O path 34 on which competition occurs, processing proceeds to Step 1505, and when there is not, processing proceeds to Step 1512 (Step 1504).

The management program 140 creates a new storage configuration plan for avoiding the competition that occurs. First, the management program 140 references the I/O path configuration work information, and determines the I/O path 34 on which competition occurs (marked "Competition") and the virtual structure that is the cause of this occurrence. The management program 140 determines the I/O path 34, which is connected between the same devices (server 70, virtualization switch 60, storage device 40) as the I/O path 34 on which there is competition, and confirms that this I/O path 34 is not marked Recovery Time Use in the I/O path configuration work information, and is not specified as a protected resource. If both conditions are met, the management program 140 decides to make the storage configuration, which provided the virtual structure that is the cause of the competition via this I/O path 34, the new configuration plan.

When either one of the two conditions is not met, the management program 140 creates in another virtualization switch 60 via the method illustrated in FIG. 11 a virtual volume 206 capable of referencing the same data as the virtual volume 206 that has the virtual volume 206 that is the cause of the competition, or the LU 208 that is the cause of the competition as a component, and ascertains by referencing the I/O path configuration work information if the configuration can be changed so that I/O processing is carried out via a different I/O path 34. At this time, the I/O path 34 in the post-change storage configuration shall not marked Recovery Time Use, and shall not be specified as a protected resource. When a storage configuration such as this can be found, the management program 140 decides to make this the new configuration plan.

When a storage configuration such as this cannot be found, the management program 140 ascertains using the method illustrated in FIG. 12 if it is possible to change the configuration by copying the LU 208, which is a component of the virtual volume 206 that is the cause of the competition, or the data of the LU 208, which is the cause of the competition, to another storage device 40 (For FIG. 12, the explanation describes creating a virtual volume 206 corresponding to a LU 208, which was newly created, and carrying out a configuration change involving copying in the corresponding logical volume 204, but a configuration change involving copying can also be implemented in a virtual volume 206.). At this time, the I/O path 34, which the new storage configuration utilizes, shall not be marked Recovery Time Use, and shall not be specified as a protected resource. When a storage configuration such as this can be found, the management program 140 decides to make this the new configuration plan.

When new storage configurations can be decided for all the virtual structures that are the cause of competition (for example, a virtual volume 206 or a LU 208), the processing of this step is treated as a success and processing proceeds to Step 1506, and if a new storage configuration cannot be decided for even one of the virtual structures, this step is treated as a failure, processing proceeds to Step 1521, and this process ends abnormally (Step 1505).

The management program 140 ascertains if it is necessary to allocate a new LU 208. That is, upon realizing a new storage configuration, if a storage configuration change involving copying is implemented even one time, the allocation of a new LU 208 is deemed necessary and processing proceeds to Step 1507. If a storage configuration change involving copying is not implemented at all, processing proceeds to Step 1508 (Step 1506).

In relation to the storage configuration change involving copying in the new storage configuration plan, the management program 140 sets in the competition avoidance procedure an indication to the corresponding storage device 40 to create a LU 208, which is newly required as a data migration destination. The size of this LU 208 is the same as that of the migration source. The management program 140 ascertains by referencing the free resource information 146 if it is possible to secure an HDD 16 area for the new LU 208, and if there is insufficient area, the processing fails. The processing also fails if the storage device 40 is specified as a protected resource, making it impossible to carry out the above-mentioned process. When processing succeeds, the management program 140 advances to Step 1508, and when processing fails, it advances to Step 1521 and this process ends abnormally (Step 1507).

The management program 140 ascertains if a setting change is necessary between the storage device 40 and the virtualization switch 60 in the new storage configuration plan. When it is necessary, processing proceeds to Step 1509, and when it is not necessary, processing proceeds to Step 1510 (Step 1508).

The management program 140 additionally sets in the competition avoidance procedure a procedure for a setting between the storage device 40 and virtualization switch 60 for realizing the new storage configuration plan. First, the management program 140 references the I/O path configuration work information, determines the difference between the LU 208 provider (port setting) in the storage device 40 of the new storage configuration plan and of the current configuration, and, in relation to the provider of the currently unset LU 208, which will be used in the new storage configuration plan, additionally sets in the recovery processing procedure an indication for the storage device 40 to set the corresponding relationship of the LU 208 and port 36 so as to provide the LU 208. Next, as needed, the management program 140 additionally sets in the competition avoidance procedure an indication for the virtualization switch 60 to recognize the newly provided LU 208. Thereafter, the management program 140 additionally sets in the competition avoidance procedure an indication for the virtualization switch 60 to use the newly provided LU 208, and to either change the configuration of the virtual volume 206 to coincide with the new storage configuration plan, or to create a new virtual volume.

Processing fails here when the storage device 40, virtualization switch 60, and virtual volume 206 are specified as protected resources, thereby making it impossible to carry out the above-mentioned processing. When processing succeeds, the management program 140 advances to Step 1510, and when processing fails, it advances to Step 1521 and this process ends abnormally (Step 1509).

The management program 140 ascertains if it is necessary to change the setting between the virtualization switch 60 and the server 70 in the new storage configuration plan. When it is deemed necessary, processing proceeds to Step 1511, and when it is not deemed necessary, processing proceeds to Step 1512 (Step 1510).

The management program 140 additionally sets in the competition avoidance procedure a procedure for a setting between the virtualization switch 60 and the server 70 for realizing the new storage configuration plan. First, the management program 140 references the I/O path configuration work information, determines the difference between the virtual volume 206 provider (port setting) in the virtualization switch 60 of the new storage configuration plan and of the current configuration, and, in relation to the provider of the currently unset virtual volume 206, which will be used in the new storage configuration plan, additionally sets in the recovery processing procedure an indication for the virtualization switch 60 to set the corresponding relationship of the virtual volume 206 and port 36 so as to provide the virtual volume 206. Next, as needed, the management program 140 additionally sets in the competition avoidance procedure an indication for the volume manager 78 to recognize the newly provided virtual volume 206. Thereafter, the management program 140 additionally sets in the competition avoidance procedure an indication for the volume manager 78 to use the newly provided virtual volume 206, and to change the configuration of the logical volume 204 to coincide with the new storage configuration plan.

Processing fails here when the virtualization switch 60, volume manager 78, and logical volume 204 are specified as protected resources, thereby making it impossible to carry out the above-mentioned processing. When processing succeeds, the management program 140 advances to Step 1512, and when processing fails, it advances to Step 1521 and this process ends abnormally (Step 1511).

The management program 140 determines the differences in the storage configurations from the logical volume 204 corresponding to the recovery-targeted data to the LU 208 at the current time and subsequent to applying the complete recovery procedure/competition avoidance procedure (which was set until now), and additionally sets in the competition avoidance procedure an indication to delete a storage component that is not required.

First, referencing the configuration history information 142 using the same method as in Step 1206, the management program 140 determines the storage configuration corresponding to the recovery-targeted data of the current time. Thereafter, the management program 140 reflects the parts of the configuration that changed in accordance with the application of the complete recovery procedure/competition avoidance procedure in the determined configuration, and determines the storage configuration subsequent to recovery processing. The management program 140 compares the two, determines the logical volume 204 which will not be used subsequent to recovery processing, the port setting of the virtualization switch 60, the virtual volume 206, the port setting of the storage device 40 and the LU 208, and additionally sets in the competition avoidance procedure indications for the corresponding volume manager 78, virtualization switch 60 and storage device 40 for the deletion thereof. Furthermore, the setting sequence of the deletion indications (transmission sequence) conforms to the above-mentioned element enumeration sequence. Furthermore, processing fails when the storage device 40, virtualization switch 60, volume manager 78, LU 208, virtual volume 206, and logical volume 204 are specified as protected resources, thereby making it impossible to carry out the above-mentioned processing. When processing succeeds, the management program 140 advances to Step 1520, and when processing fails, it advances to Step 1521 and this process ends abnormally (Step 1512).

The management program 140 ends this process normally (Step 1520).

Figure 19:
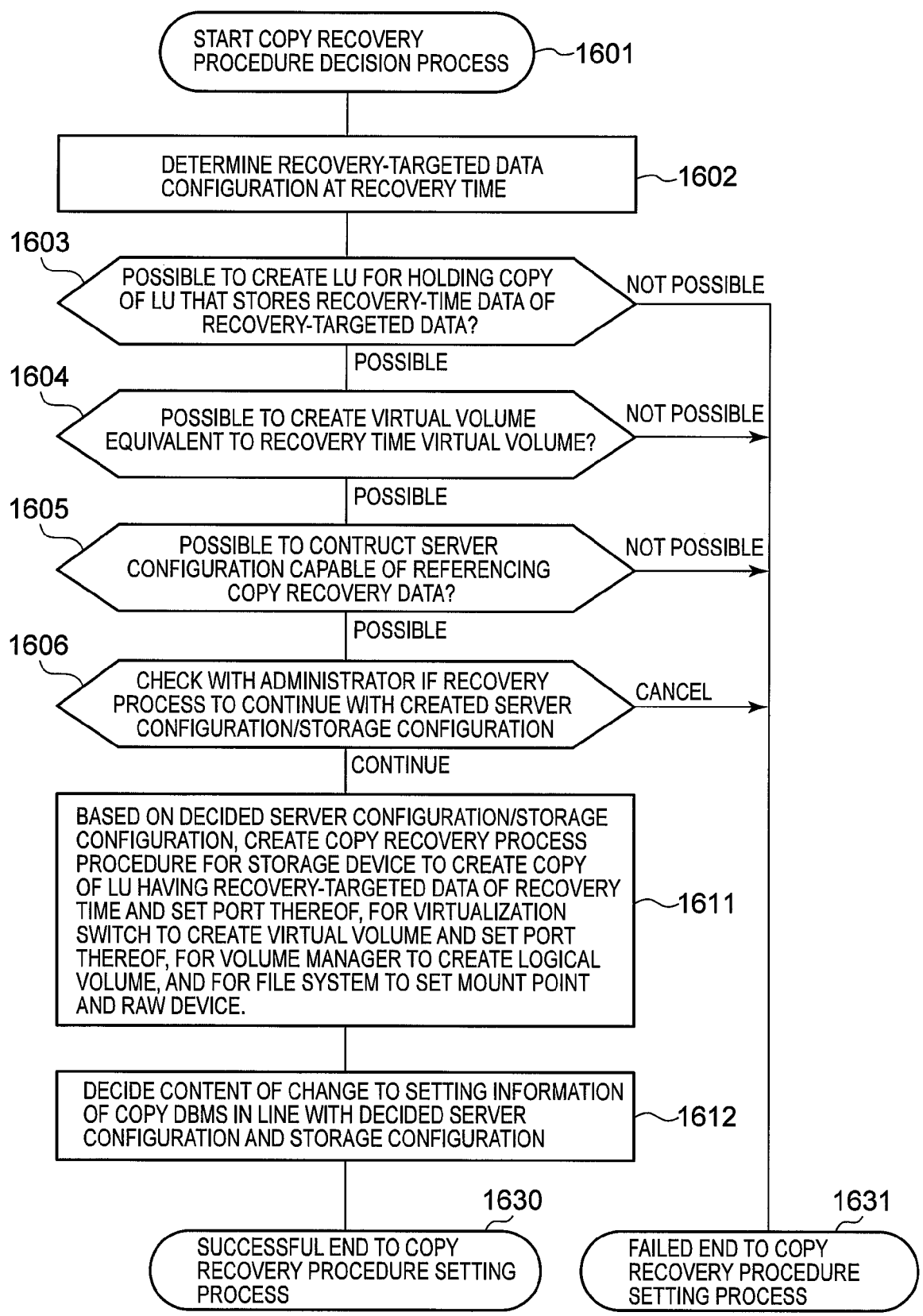
FIG. 19 is a diagram showing an example of the processing flow of a process for determining a copy recovery procedure.

FIG. 19 shows a flowchart of one example of a processing flow of a process, which is implemented as Step 1222 by the management program 140, and which decides a copy recovery procedure. With the exception of the indication for the file system 80, the procedure set before the procedure set in this process is executed beforehand in Step 1223. The process is started in Step 1601. Furthermore, at the start of this process, constraints may be furnished in relation to virtualization switch 60 and server 70 that are capable of being used.

The management program 140 references the configuration history information 142 using the same method as that of Step 1206, and determines the server configuration of the recovery-targeted DBMS at the recovery time, and the storage configuration from the file 202 corresponding to the recovery-targeted data (to include a situation that makes use of the raw device mechanism) to the LU 208 inside the storage device 40 (Step 1602).

The management program 140 ascertains if it is possible to create a LU 208 for holding copy recovery data (hereinafter, copy LU). It ascertains if it is possible to create a copy of the LU 208 corresponding to the recovery-targeted data at the recovery time determined in Step 1602 in a range, for example, within the same storage device 40. Referencing the free resource information 146, the management program ascertains if it is possible to secure, as the copy LU storage area, a part that is the same size as the copy source LU 208. If the storage device 40 capable of being the copy destination is specified as a protected resource, the management program 140 makes the determination that copying is not possible. If all the copy LU are capable of being created, processing proceeds to Step 1604, and if there is even one copy LU that is not cable of being created, processing proceeds to Step 1631 and this process ends abnormally (Step 1603).

The management program 140 ascertains if it is possible to create a virtual volume that is "equivalent" to the virtual volume 206 corresponding to the recovery-targeted data of recovery time (a state in which the corresponding storage area in the storage device 40 is a copy LU, and the corresponding relationship with the copy LU in the storage area (I/O destination) of the management structure is logically identical to that of the recovery-targeted data of the recovery time). Referencing the respective virtualization switches 60 in the configuration history information 142, the latest switch setting information 500 corresponding to the storage device 40, and the receiving port/sending port settings comprising the storage device setting information 550, the management program 140 determines the I/O path 34 corresponding to the virtualization switch 60 that is capable of referencing the respective copy LUs. Furthermore, a virtualization switch 60, which is either specified as a protected resources, or does not meet a constraint provided at the start of processing, is excluded. The management program ascertains if it is possible to create a virtual volume 206 equivalent to the virtual volume 206 corresponding to the recovery-targeted data of the recovery time determined in Step 1602 (if all LU 208 holding corresponding data can be referenced) for each virtualization switch 60, and stores all the virtualization switches 60 and virtual volumes 206 capable of being created, and the corresponding I/O path 34 group.

If all equivalent virtual volumes 206 can be created by any of the virtualization switches, processing proceeds to Step 1605, and if there is even one equivalent virtual volume 206 that cannot be created, processing proceeds to Step 1631 and this process ends abnormally (Step 1604).

The management program 140 ascertains if it is possible to construct a server configuration that makes it possible to reference copy recovery data. Referencing the respective servers 70 in the configuration history information 142, the latest OS setting information 440 corresponding to the virtualization switch 60, and the receiving port/sending port settings comprising the switch setting information 500, the management program 140 determines the I/O path 34 corresponding to the server 70 that is capable of referencing the respective equivalent virtual volumes 206, and stores these groups. Furthermore, a server 70, which is either specified as a protected resource, or does not meet a constraint provided at the start of processing, is excluded. Further, the management program references the free resource information 146, and also excludes a server 70 with an identifier that is not comprised in free server ID 672, confirming only a free server.

When the recovery-targeted DBMS is not a cluster configuration, or is a shared disk-type cluster configuration, it is possible to construct a server configuration that is able to reference copy recovery data if at least one free server is capable of referencing all of the equivalent virtual volumes 206. When the recovery-targeted DBMS is not a cluster configuration, one of the reference-enabled free servers is arbitrarily selected here. When it is a shared disk-type cluster configuration, an arbitrary number's worth of free servers is selected from thereamong (either the number of servers in the recovery-targeted DBMS configuration at recovery time or one server).

When the recovery-targeted DBMS is a shared nothing-type cluster configuration, the management program 140, based on the recovery-targeted DBMS server configuration of the recovery time and the storage configuration of the recovery-targeted data, which were determined in Step 1602, creates a group of equivalent virtual volumes 206 corresponding to the group of virtual volumes 206, which the respective component servers have been referencing. A free server, which is capable of referencing all the elements of the group of equivalent virtual volumes 206 that were created, can become an alternate server of this component. When a free server capable of becoming an alternate server exists for the servers of all the components, a server configuration capable of referencing copy recovery data can be constructed (A single free server can serve as an alternate server for a plurality of servers.). When a plurality of free servers are capable of becoming alternate servers for the server of a certain component, an arbitrary server is selected (For a configuration in which the number of servers is increased, a plurality of servers are selected.). Furthermore, when a DBMS 90 that runs on a plurality of servers is implemented by a single alternate server, or when making use of a copy DBMS server configuration by using more alternate servers than the recovery-targeted DBMS server configuration at recovery time, the management program 140 simultaneously implements the creation of a data reallocation plan, which utilizes an equivalent virtual volume that an alternate server can reference, using the same method as that of Step 1405.

If a server configuration capable of referencing copy recovery data can be constructed, processing proceeds to Step 1606, and if there is even one for which construction is not possible, processing proceeds to Step 1631 and this process ends abnormally (Step 1605).

The management program 140 uses the notification screen via the management terminal 110 to check with the administrator if recovery processing will continue with the created server configuration and storage configuration. If the administrator responds that processing will continue, the management program 140 advances to Step 1611. If the response is that processing will be cancelled, the management program 140 advances to Step 1631 and ends this process abnormally. Furthermore, as administrator determinations other than continuation/cancellation of processing, process re-execution from Step 1601 in accordance with different constraints can be added (Step 1606).

The management program 140 sets a copy recovery processing procedure for realizing server configuration and storage configuration, which were created. The setting contents and setting order thereof (issuing of indications in accordance with setting sequence), for example, are as follows:

i) an indication for storage device 40 to create copy LU (indicates same size as copy-source LU 208);

ii) an indication for storage device 40 to set corresponding relationship of LU 208 and port 36 to enable virtualization switch 60 to reference copy LU;

iii) as needed, an indication for virtualization switch 60 to recognize newly provided LU 208;

iv) an indication for virtualization switch 60 to create equivalent virtual volume 206 that uses newly provided LU 208;

v) an indication for virtualization switch 60 to set corresponding relationship of virtual volume 206 and port 36 to provide equivalent virtual volume 206 to alternate server;

vi) as needed, an indication for volume manager 78 of alternate server to recognize newly provided virtual volume 206;

vii) an indication for volume manager 78 of alternate server to create an equivalent logical volume 204, which utilizes an equivalent virtual volume 206 that has been provided; and viii) an indication for the file system 80 of an alternate server to set the partition mount point and raw device pathname in the equivalent logical volume 204. The mount point and raw device pathname can be specified arbitrarily (Step 1611).

The management program 140 decides the contents of a change to the setting information of the copy DBMS, which is changed to coincide with the server configuration resulting from the decided alternate server and the storage configuration resulting from the copy LU. The information to be modified includes a DBMS identifier (newly created for the copy DBMS), a network setting that coincides with the configuration of an alternate server (for example, an IP address setting), a cluster configuration setting, a data mapping setting, and a system directory path 404, which conforms to the mount point and raw device pathname decided in Step 1611 (including the setting in the environment variable 406), the modified data file pathname 422 and substantial file pathname 424, and other information for which updating is deemed necessary.

Further, when the copy DBMS is a cluster configuration, and recovery processing is carried out by a number of servers that is larger than the number of servers of the recovery-targeted DBMS at recovery time, there will be servers 70 (DBMS 90) in which there is no corresponding log data at the recovery time. The creation and initialization of a log storage area (file 202) shall be implemented for these servers (Step 1612).

The management program 140 ends this process normally (Step 1630).

According to the above-described embodiment, if the administrator specifies a point in time at which recovery is to be performed in a DB recovery process, a DB recovery process and the construction of a storage configuration for accessing the recovered DB (recovery and new construction) are carried out. Thus, a DB recovery process can be easily carried out.

Further, according to this embodiment, even when a system configuration is not completely restored to the configuration of the recovery time, the logical configuration of the storage is restored. That is, an environment capable of accessing the DB of the recovery time is constructed. Thus, it is possible to more flexibly (with less restrictions) recover an environment that is capable of accessing the DB of the recovery time.

Further, according to this embodiment, the decision as to whether a data recovery operation will be carried out using backup data, that is, any of a snapshot image, storage journal, or archive log used in a DB recovery process, can be made automatically. Therefore, the burden on the administrator in a DB recovery process is reduced in terms of the selection of backup data.

The embodiment of the present invention has been explained hereinabove, but this embodiment is merely an example for explaining the present invention, and does not purport to restrict the scope of the present invention to this embodiment. The present invention can be implemented in a variety of other modes without departing from the gist thereof. For example, this embodiment could be widely used to manage computer systems, which comprise computers that run DBMS.

What is claimed is:

1. A computer system management method in a computer system, the computer system comprising a server; a virtualization switch, which is connected to the server via a first path; a storage device, which is connected to the virtualization switch via a second path; and a management server, which is connected to the server, virtualization switch, and storage device via a network, wherein the management server comprises a configuration history information table, the method comprising;

acquiring, by the management server, and recording in the configuration history information table, a history of the setting information of the computer system when the setting of the computer system is changed;

when there is a recovery command for a prescribed time from the computer system, comparing, by the management server, from among the history information recorded in the configuration history information table, a first configuration information corresponding to the specified recovery time, and a second configuration information corresponding to the current time, and when the two do not coincide, sending, by the management server, the first configuration information to the device, from among the server, virtualization switch, and storage device, in which a setting change is required;

changing, by the device, from among the server, virtualization switch, and storage device, which received the first configuration information, a setting based on this first configuration information, wherein the management server selects a recovery method of any of recovery methods, which physically and logically restore, or logically restore, or logically and partially restore a system configuration specified by the first configuration information, and wherein the management server compares the first configuration information and second configuration information, and when the setting of the first path and the second path coincide at the current time and at the recovery time, and path competition is generated, changes the setting of the second path at the current time, and thereafter, changes the setting of the first path at the current time.

2. The computer system management method according to claim 1, wherein the management server sends the first configuration information to any of the server, the virtualization switch, and the storage device, which is connected to the path for which a setting change is required from among the first path or the second path.

3. A management device in a computer system in which a host computer accesses a storage device, the management device comprising:

a configuration history storage unit for storing configuration history information indicating a history of changes in a system configuration, which is a configuration related to an access environment until a data utilization unit which utilizes data, in the host computer, accesses data inside the storage device;

a setting change required/not required specification unit, which, by referencing the configuration history information, specifies a system configuration of a recovery time, which is a certain point in time in the past, and specifies a system configuration of the current time, compares the system configuration of the recovery time with the system configuration of the current time, and based on the results of this comparison, specifies whether or not there is a system configuration part in the system configuration of the current time for which, if data of the recovery time is recovered, a setting change is required in order to access this recovered data;

a data recovery unit for recovering data of the recovery time to the storage device; and a system configuration construction unit, which, when the system configuration part is specified, constructs a system configuration for enabling the data utilization unit to access the recovered data by issuing an indication related to a required setting change to an element capable of carrying out the setting change for this system configuration part.

4. A management device in a computer system in which a host computer accesses a storage device, the management device comprising:

a configuration history storage unit for storing configuration history information indicating a history of changes in a system configuration, which is a configuration related to an access environment until a data utilization unit which utilizes data, in the host computer, accesses data inside the storage device;

a setting change required/not required specification unit, which, by referencing the configuration history information, specifies a system configuration of a recovery time, which is a certain point in time in the past, and specifies a system configuration of the current time, compares the system configuration of the recovery time with the system configuration of the current time, and based on the results of this comparison, specifies whether or not there is a system configuration part in the system configuration of the current time for which, if data of the recovery time is recovered, a setting change is required in order to access this recovered data;

a data recovery unit for recovering data of the recovery time to the storage device; and a system configuration construction unit, which, when the system configuration part is specified, constructs a system configuration for enabling the data utilization unit to access the recovered data by issuing an indication related to a required setting change to an element capable of carrying out the setting change for this system configuration part;

a recovery method selection unit for selecting either of a complete recovery, which is a recovery method for recovering a system configuration that is exactly the same as the system configuration at the recovery time, or a copy recovery, which is a recovery method for creating copy data, which is a copy of the recovered data, and for constructing a new system configuration for using this created copy data, wherein, when the complete recovery is selected as the recovery method, the setting change required/not required specification unit specifies the difference between the system configuration of the current time and the system configuration of the recovery time, and the system configuration construction unit sends to the element related to this difference a setting change indication for restoring this difference to the recovery time system configuration, and wherein, when the copy recovery is selected as the recovery method, the data recovery unit creates copy data of the recovered data, and, to construct a new system configuration for using this created copy data, the system configuration construction unit sends a setting indication for constructing this new system configuration to an element capable of carrying out a setting in each system configuration part of a new system configuration.

5. The management device according to claim 4, wherein the recovery method selection unit selects complete copy recovery as the copy recovery when recovering all of a data group comprising a plurality of data, and selects partial copy recovery as the copy recovery when recovering a portion of this data group, and the data recovery unit copies the entire data group at the recovery time when the complete copy recovery is selected, and copies a portion of the data group at the recovery time when the partial copy recovery is selected.

6. A management device in a computer system in which a host computer accesses a storage device, the management device comprising:
- a configuration history storage unit for storing configuration history information indicating a history of changes in a system configuration, which is a configuration related to an access environment until a data utilization unit which utilizes data, in the host computer, accesses data inside the storage device;
- a setting change required/not required specification unit, which, by referencing the configuration history information, specifies a system configuration of a recovery time, which is a certain point in time in the past, and specifies a system configuration of the current time, compares the system configuration of the recovery time with the system configuration of the current time, and based on the results of this comparison, specifies whether or not there is a system configuration part in the system configuration of the current time for which, if data of the recovery time is recovered, a setting change is required in order to access this recovered data;
- a data recovery unit for recovering data of the recovery time to the storage device; and
- a system configuration construction unit, which, when the system configuration part is specified, constructs a system configuration for enabling the data utilization unit to access the recovered data by issuing an indication related to a required setting change to an element capable of carrying out the setting change for this system configuration part,
- wherein, when other data is stored in a first storage area in the storage device for data of the recovery time, the data recovery unit migrates the other data to a second storage area in the storage device, thereby making the first storage area a free area, and recovers the data of the recovery time to the first storage area, which has become a free area.

7. A management device in a computer system in which a host computer accesses a storage device, the management device comprising:
- a configuration history storage unit for storing configuration history information indicating a history of changes in a system configuration, which is a configuration related to an access environment until a data utilization unit which utilizes data, in the host computer, accesses data inside the storage device;
- a setting change required/not required specification unit, which, by referencing the configuration history information, specifies a system configuration of a recovery time, which is a certain point in time in the past, and specifies a system configuration of the current time, compares the system configuration of the recovery time with the system configuration of the current time, and based on the results of this comparison, specifies whether or not there is a system configuration part in the system configuration of the current time for which, if data of the recovery time is recovered, a setting change is required in order to access this recovered data;
- a data recovery unit for recovering data of the recovery time to the storage device; and
- a system configuration construction unit, which, when the system configuration part is specified, constructs a system configuration for enabling the data utilization unit to access the recovered data by issuing an indication related to a required setting change to an element capable of carrying out the setting change for this system configuration part,
- wherein, when the storage device comprises a snapshot acquisition unit for acquiring a snapshot, which is an image of data at a certain point in time; and
- a storage journal unit, which, each time there is a data update, creates and stores a storage journal, which is a history of this update, and the host computer comprises a log creation unit for creating an update log each time there is a data update, and for storing the update log in the storage device, the data recovery unit causes the storage device to recover data of the recovery time by reflecting not less than one storage journal in a snapshot at a certain point in time, and when this data cannot be recovered because at least one of the not less than one storage journal does not exist, causes the host computer to recover the data using the update log.

* * * * *